(12) United States Patent
Chen

(10) Patent No.: US 10,140,972 B2
(45) Date of Patent: Nov. 27, 2018

(54) TEXT TO SPEECH PROCESSING SYSTEM AND METHOD, AND AN ACOUSTIC MODEL TRAINING SYSTEM AND METHOD

(71) Applicant: Kabushiki Kaisha Toshiba, Minato-ku (JP)

(72) Inventor: Langzhou Chen, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 498 days.

(21) Appl. No.: 14/466,340

(22) Filed: Aug. 22, 2014

(65) Prior Publication Data

US 2015/0058019 A1 Feb. 26, 2015

(30) Foreign Application Priority Data

Aug. 23, 2013 (GB) .................................. 1315139.4

(51) Int. Cl.
 *G10L 13/02* (2013.01)
 *G10L 13/08* (2013.01)
 (Continued)

(52) U.S. Cl.
 CPC .............. *G10L 13/08* (2013.01); *G10L 13/02* (2013.01); *G10L 13/10* (2013.01); *G10L 15/06* (2013.01)

(58) Field of Classification Search
 CPC .. G10L 13/08; G10L 13/10; G10L 2015/0631
 See application file for complete search history.

(56) References Cited

U.S. PATENT DOCUMENTS

2011/0112825 A1\* 5/2011 Bellegarda .......... G06F 17/2785
704/9
2011/0218804 A1 9/2011 Chun
(Continued)

FOREIGN PATENT DOCUMENTS

EP 2 639 791 A1 9/2013
GB 2478314 A 9/2011
(Continued)

OTHER PUBLICATIONS

Emily Mower, Kyu J. Han, Sunbok Lee, Shrikanth Narayanan "A Cluster Profile Representation of Emotion Using Agglomerative Hierarchial Clustering" Univiersity of Southern California Sep. 2010, pp. 797-800.\*
(Continued)

*Primary Examiner* — Keara Harris
(74) *Attorney, Agent, or Firm* — Oblon, McClelland, Maier & Neustadt, L.L.P.

(57) ABSTRACT

A method of training an acoustic model for a text-to-speech system,
 the method comprising:
 receiving speech data;
 said speech data comprising data corresponding to different values of a first speech factor,
 and wherein said speech data is unlabeled, such that for a given item of speech data, the value of said first speech factor is unknown;
clustering said speech data according to the value of said first speech factor into a first set of clusters; and
 estimating a first set of parameters to enable the acoustic model to accommodate speech for the different values of the first speech factor,
(Continued)

wherein said clustering and said first parameter estimation are jointly performed according to a common maximum likelihood criterion.

9 Claims, 20 Drawing Sheets

(51) Int. Cl.
   *G10L 13/10* (2013.01)
   *G10L 15/06* (2013.01)

(56) References Cited

U.S. PATENT DOCUMENTS

| | | |
|---|---|---|
| 2012/0221339 A1 | 8/2012 | Wang et al. |
| 2012/0278081 A1* | 11/2012 | Chun ............... G10L 13/02 704/260 |
| 2013/0185070 A1 | 7/2013 | Huo et al. |
| 2014/0025382 A1 | 1/2014 | Chen et al. |

FOREIGN PATENT DOCUMENTS

| | | |
|---|---|---|
| JP | 64-78300 A | 3/1989 |
| JP | 2012-529664 A | 11/2012 |

OTHER PUBLICATIONS

Extended European Search Report dated Mar. 16, 2015 in Patent Application No. 14195489.1.
Langzhou Chen, et al., "Integrated automatic expression prediction and speech synthesis from text" 2013 IEEE International Conference on acoustics, speech and signal processing, XP 32508860A, May 26, 2013, pp. 7977-7981.
Heiga Zen, et al., "Statistical Parametric Speech Synthesis Based on Speaker and Language Factorization" IEEE Transactions on audio, speech, and language processing, vol. 20, No. 6, XP11455763A, Aug. 2012, pp. 1713-1724.
U.S. Appl. No. 13/941,968, filed Jul. 15, 2013, 2014/0025382 A1, Langzhou Chen, et al.
United Kingdom Search Report dated Mar. 3, 2014, in Great Britain Application No. 1315139.4 filed Aug. 23, 2013.
Heiga Zen, et al., "Statistical Parametric Speech Synthesis Based on Speaker and Language Factorization", IEEE Transactions on Audio, Speech, & Language Processing, vol. 10, No, 10, Jan. 2011, 11 pages.
Javier Latorre, et al., "Speech factorization for HMM-TTS based on cluster adaptive training." Proc. Of interspeech 2012, 4 pages.
Florian Eyben, et al., "Unsupervised Clustering of Emotion and Voice Styles for Expressive TTS", Proc. Of ICASSP 2012, 4 pages.
Theodoris Giannakopoulos, et al., "Unsupervised Speaker Clustering in a Linear Discriminant Subspace", 2010 Ninth International Conference on Machine Learning and Applications (ICMLA), Dec. 12, 2010, 4 pages.
Office Action dated Nov. 10, 2015 in Japanese Patent Application No. 2014-169878 (submitting English translation only).
J. Ajmera, et al., "A Robust Speaker Clustering Algorithm" IEEE, Dec. 2003, pp. 411-416.
Extended European Search Report dated Feb. 5, 2015 in Patent Application No. 14181207.3.
Office Action dated Jun. 20, 2018 in Chinese Application No. 201410419320.0 (w/English translation).
Heiga Zen et al., "Statistical Parametric Speech Synthesis", vol. 51, No. 11, Mar. 19, 2009, http://id.nii.ac.ip/1476/00005426, pp. 1-23.

* cited by examiner

TEXT TO SPEECH PROCESSING SYSTEM AND METHOD, AND AN ACOUSTIC MODEL TRAINING SYSTEM AND METHOD

CROSS-REFERENCE TO RELATED APPLICATION

This application is based upon and claims the benefit of priority from prior United Kingdom Application number 1315139.4 filed on Aug. 23, 2013, the entire contents of which are incorporated herein by reference.

FIELD

Embodiments of the present invention as generally described herein relate to a text-to-speech system and method.

BACKGROUND

Text to speech systems are systems where audio speech or audio speech files are outputted in response to reception of a text file.

Text to speech systems are used in a wide variety of applications such as electronic games, E-book readers, E-mail readers, satellite navigation, automated telephone systems, automated warning systems.

There is a continuing need to make systems sound more like a human voice.

BRIEF DESCRIPTION OF THE FIGURES

Systems and Methods in accordance with non-limiting embodiments will now be described with reference to the accompanying figures in which.

DETAILED DESCRIPTION

Figure 1:
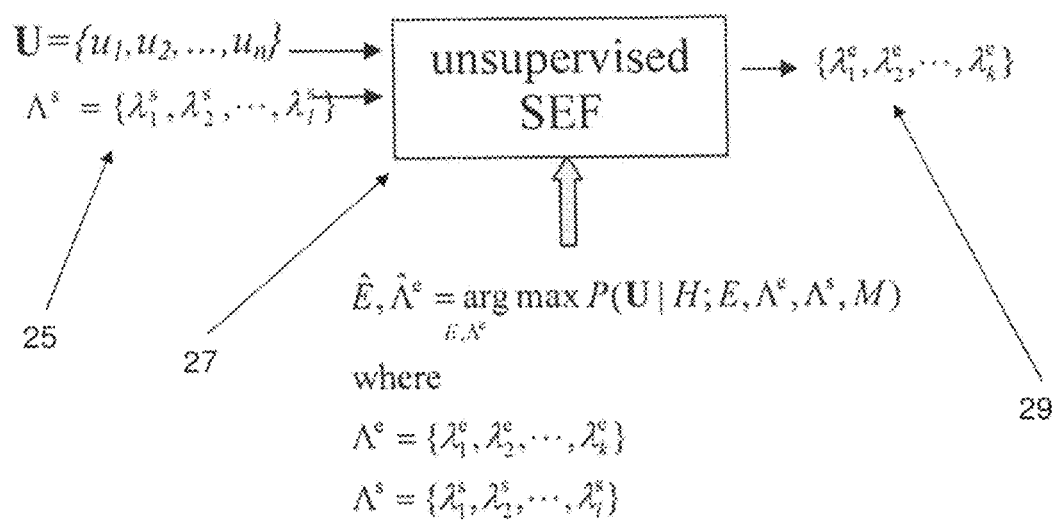
FIG. 1 is a framework for training an acoustic model according to an embodiment.

In an embodiment, a method of training an acoustic model for a text-to-speech system is provided, the method comprising: receiving speech data; said speech data comprising data corresponding to different values of a first speech factor, and wherein said speech data is unlabelled, such that for a given item of speech data, the value of said first speech factor is unknown; clustering said speech data according to the value of said first speech factor into a first set of clusters; and estimating a first set of parameters to enable the acoustic model to accommodate speech for the different values of the first speech factor, wherein said clustering and said first parameter estimation are jointly performed according to a common maximum likelihood criterion. The first speech factor may comprise speaker; expression; noise; a character voice such as "the king", "the wolf", etc; or any other factor of speech. Expression comprises an attribute of speech which is independent of speaker. Examples of expression include emotion, such as happy, sad etc; emphasis; and speaking style. Expression may also correspond to a combination of more than one of the above. Neutral speech is speech without any expression, e.g. speech without emotion or emphasis. Unlabelled speech data is data for which, for example if the first speech factor is expression, it is not known which expression corresponds to a given portion of the speech data.

In one embodiment, the first set of clusters comprises at least one sub-cluster. The first set of parameters may be weights to be applied such there is one weight per sub-cluster, and wherein said weights are dependent on said first speech factor. The weights may be cluster adaptive training (CAT) weights. Each sub-cluster may comprise at least one decision tree, said decision tree being based on questions relating to at least one of linguistic, phonetic or prosodic differences. There may be differences in the structure between the decision trees of the clusters and between trees in the sub-clusters.

In one embodiment, the first set of parameters are constrained likelihood linear regression transforms which are dependent on said first speech factor.

In one embodiment, the first speech factor is speaker and said speech data further comprises speech data from one or more speakers speaking with neutral speech.

In one embodiment the speech data further comprises data corresponding to different values of a second speech factor. The second speech factor may comprise speaker, expression, noise, accent or any other factor of speech. The value of second speech factor may be unknown.

In one embodiment, the method further comprises receiving text data corresponding to said received speech data; extracting expressive features from said input text to form an expressive linguistic feature vector constructed in a first space; extracting expressive features from the speech data and forming an expressive feature synthesis vector constructed in a second space; training a machine learning algorithm, the training input of the machine learning algorithm being an expressive linguistic feature vector and the training output the expressive feature synthesis vector which corresponds to the speech data and the text data. The text data corresponds to the speech data such that the speech data corresponds to the speaking of the text comprising the text data.

In an embodiment, second space is the acoustic space of a first speaker and the method is configured to transplant the expressive synthesis feature vector to the acoustic space of a second speaker. This means that the speech is synthesised with the voice of the second speaker but the expression prediction corresponds to that of the first speaker.

In one embodiment the method comprises clustering said speech data according to the value of said second speech factor into a second set of clusters; and estimating a second set of parameters to enable the acoustic model to accommodate speech for the different values of the second speech factor, wherein said clustering and said second parameter estimation are jointly performed according to a single maximum likelihood criterion which is common to both said second parameter estimation and said clustering into a second set of clusters.

The second set of clusters may comprise at least one sub-cluster. The second set of parameters may be weights to be applied such there is one weight per sub-cluster. The weights may be dependent on said second speech factor. The weights may be cluster adaptive training (CAT) weights.

The second set of parameters may be constrained likelihood linear regression transforms which are dependent on the second speech factor.

In an embodiment, training the acoustic model further comprises: training a first acoustic sub model using speech data received from a speaker speaking with neutral speech; and training a second acoustic sub-model using speech data corresponding to different values of the second speech factor.

In an embodiment, the acoustic model comprises probability distribution functions which relate the acoustic units to a sequence of speech vectors. The probability distributions may be selected from a Gaussian distribution, Poisson distribution, Gamma distribution, Student-t distribution or Laplacian distribution.

In an embodiment, a text-to-speech method configured to output speech having a target value of a speech factor is provided, said method comprising: inputting adaptation data with said target value of a speech factor; adapting an acoustic model to said target value of a speech factor; inputting text; dividing said inputted text into a sequence of acoustic units; converting said sequence of acoustic units into a sequence of speech vectors using said acoustic model; and outputting said sequence of speech vectors as audio with said target value of a speech factor, wherein said acoustic model comprises a set of speech factor parameters relating to said speech factor, and a set of speech factor clusters relating to said speech factor, and wherein said set of speech factor parameters and said set of speech factor clusters relating to said speech factor are unlabelled, such that for a given one or more clusters and a given one or more parameters, the value of said speech factor to which they relate is unknown. The first set of clusters and the first set of parameters are unlabelled prior to the adaptation of the acoustic model. The adaptation data may comprise audio. In an embodiment, said speech factor is expression and the acoustic model further comprises a set of parameters relating to speaker and a set of clusters relating to speaker; and said set of expression parameters and said set of speaker parameters and said set of expression clusters and said set of speaker clusters do not overlap. In a further embodiment, the method is configured to transplant an expression from a first speaker to a second speaker, by employing expression parameters obtained from the speech of a first speaker with that of a second speaker.

In an embodiment, a text-to-speech method configured to output speech having a target value of a speech factor is provided, said method comprising: inputting adaptation data with said target value of a speech factor; adapting an acoustic model to said target value of a speech factor; inputting text; dividing said inputted text into a sequence of acoustic units; converting said sequence of acoustic units into a sequence of speech vectors using said acoustic model; and outputting said sequence of speech vectors as audio with said target value of a speech factor, wherein said acoustic model comprises a set of speech factor parameters relating to said speech factor, and a set of speech factor clusters relating to said speech factor, and wherein the acoustic model was trained using a method comprising: receiving speech data; said speech data comprising data corresponding to different values of the speech factor, and wherein said speech data is unlabelled, such that for a given item of speech data, the value of said speech factor is unknown; clustering said speech data according to the value of said speech factor into a first set of clusters; and estimating a first set of parameters to enable the acoustic model to accommodate speech for the different values of the speech factor, wherein said clustering and said first parameter estimation are jointly performed according to a common maximum likelihood criterion.

The first set of clusters and the first set of parameters are unlabelled prior to the adaptation of the acoustic model. The adaptation data may comprise audio. In an embodiment, said speech factor is expression and the acoustic model further comprises a set of parameters relating to speaker and a set of clusters relating to speaker; and said set of expression parameters and said set of speaker parameters and said set of expression clusters and said set of speaker clusters do not overlap. In a further embodiment, the method is configured to transplant an expression from a first speaker to a second speaker, by employing expression parameters obtained from the speech of a first speaker with that of a second speaker. This means that the adaptation data may comprise data from a first speaker speaking with an expression. From this, the voice of a different speaker speaking with the same expression is synthesized.

In an embodiment, a text to speech method is provided, the method comprising: receiving input text; dividing said inputted text into a sequence of acoustic units; converting said sequence of acoustic units to a sequence of speech vectors using an acoustic model, wherein said acoustic model comprises a first set of parameters relating to speaker voice and a second set of parameters relating to expression, and wherein the first and second set of parameters do not overlap; and outputting said sequence of speech vectors as audio, the method further comprising determining at least some of said parameters relating to expression by: extracting expressive features from said input text to form an expressive linguistic feature vector constructed in a first space; and mapping said expressive linguistic feature vector to an expressive synthesis feature vector which is constructed in a second space. The first and second parameters may be unlabelled, such that, for a given second parameter, the expression to which it corresponds is unknown and for a given first parameter, the speaker voice to which it corresponds is unknown. One or both of the first and second set of parameters may be unlabelled. In an embodiment, second space is the acoustic space of a first speaker and the method is configured to transplant the expressive synthesis feature vector to the acoustic space of a second speaker.

In an embodiment, the acoustic model is trained such that the first set of clusters and the first set of parameters are estimated according to a common maximum likelihood criterion. In another embodiment, the acoustic model is trained such that the second set of clusters and the second set of parameters are estimated according to a common maximum likelihood criterion.

In an embodiment, a system for training an acoustic model for a text-to-speech system is provided, said system comprising: an input for receiving speech data corresponding to different values of a first speech factor, wherein said speech data is unlabelled, such that, for a given item of data, the value of said first speech factor is unknown; a processor configured to: cluster said speech data according to the value of said first speech factor into a first set of clusters; and estimate a first set of parameters to enable to the acoustic model to accommodate speech for the different values of the first speech factor, wherein said clustering and said first parameter estimation are jointly performed according to a single maximum likelihood criterion which is common to both said first parameter estimation and said clustering into said first set of clusters.

In an embodiment, a system configured to output speech having a target value of a speech factor is provided, said system comprising: an input for receiving adaptation data with said target value of a speech factor; an input for receiving text; and a processor configured to adapt an acoustic model to said target value of a speech factor; divide said inputted text into a sequence of acoustic units; convert said sequence of acoustic units into a sequence of speech vectors using said acoustic model; and output said sequence of speech vectors as audio with said target value of a speech factor, wherein said acoustic model comprises a first set of parameters relating to said speech factor, and a first set of clusters relating to said speech factor, and wherein said first set of parameters and said first set of clusters relating to said speech factor are unlabelled, such that for a given one or more clusters and a given one or more parameters, the value of said first speech factor is unknown.

In an embodiment, a text to speech system is provided, said system comprising a text input for receiving inputted text; a processor configured to divide said inputted text into a sequence of acoustic units; convert said sequence of acoustic units to a sequence of speech vectors using an acoustic model, wherein said acoustic model comprises a first set of parameters relating to speaker voice and a second set of parameters relating to expression, and wherein the first and second set of parameters do not overlap; and outputting said sequence of speech vectors as audio; determine at least some of said parameters relating to expression by: extracting expressive features from said input text to form an expressive linguistic feature vector constructed in a first space; and map said expressive linguistic feature vector to an expressive synthesis feature vector which is constructed in a second space. The first and second parameters may be unlabelled, such that, for a given second parameter, the expression to which it corresponds is unknown and for a given first parameter, the speaker voice to which it corresponds is unknown. One or both of the first and second set of parameters may be unlabelled. In an embodiment, second space is the acoustic space of a first speaker and the method is configured to transplant the expressive synthesis feature vector to the acoustic space of a second speaker.

In an embodiment, a speech synthesis training method is provided to model the expression and speaker simultaneously based on the training data in which the expression or speaker or expression and speaker information are unlabelled. In an embodiment, the independent expression and speaker information are extracted from unlabelled data in which the expression and speaker information are mixed together. In an embodiment, the expression clustering process and parameter estimation are integrated as a single process. The expression clustering process and parameter estimation process may be performed simultaneously with a common maximum likelihood (ML) criterion. The output of the method may comprise speaker independent expression CAT weight vectors for each expression cluster and expression independent speaker CAT weight vectors for each speaker. The output of the method may comprise speaker independent CAT weight vectors for each expression cluster and expression independent speaker constrained maximum likelihood linear regression (CMLLR) transforms for each speaker. The output of the method may comprise speaker independent expression CMLLR transforms for each expression cluster and expression independent CAT weight vectors for each speaker. The output of the method may comprise speaker independent expression CMLLR transforms for each expression cluster and expression independent speaker CMLLR transforms for each speaker.

In an embodiment, a text to speech system is provided, the system comprising:
   an input for receiving input text; and
   a processor configured to
   divide said inputted text into a sequence of acoustic units;
   convert said sequence of acoustic units to a sequence of speech vectors using an acoustic model, wherein said acoustic model comprises a first set of parameters and a first set of clusters relating to speaker voice and a second set of parameters and a second set of clusters relating to expression, and wherein the first and second set of parameters and the first and second set of clusters do not overlap; and
   output said sequence of speech vectors as audio,
   determine at least some of said parameters relating to expression by:
   extracting expressive features from said input text to form an expressive linguistic feature vector constructed in a first space; and
   mapping said expressive linguistic feature vector to an expressive synthesis feature vector which is constructed in a second space.

Methods in accordance with embodiments can be implemented either in hardware or on software in a general purpose computer. Further methods in accordance with embodiments of the present can be implemented in a combination of hardware and software. Methods in accordance with embodiments can also be implemented by a single processing apparatus or a distributed network of processing apparatuses.

Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

Details of Cluster Adaptive Training (CAT) and Constrained Maximum Likelihood Linear Regression (CMLLR) methods for training the acoustic model of a text-to-speech system are discussed in the Appendix. Speaker and expression factorization (SEF) using CAT and CMLLR methods are also described therein. These methods can be used to model factors of the speech data such as speaker and expression.

FIG. 1 shows a training framework according to an embodiment. In this embodiment, expression and/or speaker clustering of unlabelled data is integrated with SEF in a single process.

SEF may be implemented by manually labelling the training data for different speakers and expressions. Unfortunately, however, for some complicated and highly diverse training data, such as audiobook data, manually adding expression or speaker labels to the data is expensive and there is often poor inter-annotation agreement due to the high diversity of the data. For example, synthesizing an ebook may require the TTS system to read the stories expressively with the voices of different speakers. Directly modelling every combination of speaker and expression is often impractical since the expressive training data is not always available for every speaker. In these cases, the labelling or clustering of training data according to speaker or expression must be performed as part of the training of the model.

In the embodiment of FIG. 1, the training data is labelled with speaker information but not expression information. In this embodiment, the expression clustering and the expression dependent parameter estimation are conducted simultaneously according to maximum likelihood criteria, namely:

$$\hat{E}, \hat{\Lambda}^e(\hat{E}) \underset{E,\Lambda^e(E)}{=} \operatorname{argmax} P(U \mid H; E, \Lambda^e(E), \Lambda^s, M). \quad \text{Eqn. 1}$$

Where $E=\{e_1, e_2, \ldots, e_k\}$ are the expression dependent clusters; $\Lambda^e(E)=\{\lambda_1^e, \lambda_2^e, \ldots, \lambda_k^e\}$ are the expression dependent parameters, which are themselves dependent on the expression dependent clusters; $\Lambda^s=\{\lambda_1^s, \lambda_2^s, \ldots, \lambda_l^s\}$ are the speaker dependent parameters; $U=\{u_1, u_2 \ldots u_n\}$ are the training utterances; H are the transcripts of the training data; and M are the cluster mean matrices as before.

In framework of FIG. 1, the training utterances $U=\{u_1, u_2 \ldots u_n\}$ and the speaker parameters $\Lambda^s=\{\lambda_1^s, \lambda_2^s, \ldots, \lambda_l^s\}$ are input (25) into a single, unsupervised SEF process (27). This process generates the expression clusters $\hat{E}$ and the expression dependent parameters $\Lambda^e(E)=\{\lambda_1^e, \lambda_2^e, \ldots, \lambda_k^e\}$ simultaneously to maximize the likelihood of U. The expression dependent parameters are then output (29).

In this approach the entire process, both expression clustering and determination of the expression dependent parameters, is performed using a maximum likelihood criterion. This ensures that there is consistency in the training criteria. Further, the expression clustering results are unaffected by speaker factors when dealing with multi-speaker data. This ensures effective factorization of the speaker and expression clusters as the speaker information is explicitly isolated from the expression clustering process. This approach can be used with different methods of factorization based on maximum likelihood criterion. In common with other maximum likelihood based criterion for latent variable models, the auxiliary function is maximized. However, the auxiliary functions are different for different methods of factorization.

Below, CAT and CMLLR-based factorization methods according to the present embodiment are discussed. However, any maximum-likelihood based factorization method can be used in the approach of the present embodiment.

In an embodiment, CAT based factorization, as described in the appendix, is employed for unsupervised speaker and expression factorization. In this embodiment, for a particular partition of training utterances $E=\{e_1, e_2, \ldots, e_k\}$, the auxiliary function (please see the Appendix for details) can be expressed as:

$$Q(\hat{\Lambda}_E; \Lambda_E, \Lambda_S) = \sum_{j=1}^{k} \sum_{i:i \in e_j} \left( \hat{\lambda}_E^{(e_j)T} (y_E^{(i)} - X_{ES}^{(i)} \lambda_S^{(i)}) - \frac{1}{2} \hat{\lambda}_E^{(e_j)T} X_{EE}^{(i)} \hat{\lambda}_E^{(e_j)} \right). \quad \text{Eqn. 2}$$

Where the sufficient statistics are:

$$X_{EE}^{(i)} = \sum_{m,t \in T_i} \gamma_t^{(m)} M_E^{(m)T} \Sigma^{(m)-1} M_E^{(m)}, \quad \text{Eqn. 3}$$

$$X_{ES}^{(i)} = \sum_{m,t \in T_i} \gamma_t^{(m)} M_E^{(m)T} \Sigma^{(m)-1} M_S^{(m)}, \quad \text{Eqn. 4}$$

$$y_E^{(i)} = \sum_{m} M_E^{(m)T} \Sigma^{(m)-1} \sum_{t \in T_i} \gamma_t^{(m)} (O_t - \mu^{(m,l)}), \quad \text{Eqn. 5}$$

where $\gamma_t^{(m)}$ is the occupancy probability of component m in time t and $\mu^{(m,1)}$ is the mean vector of component m from the bias cluster.

In unsupervised SEF, the partition of the training data $\hat{E}$ and the expression dependent CAT weight vectors associated to this partition $\hat{\Lambda}^e(\hat{E})$ are found such that the auxiliary function is maximized.

In an embodiment, this is done using a k-style algorithm. The clusters, i.e. the partition of the training data, and the weight vectors are calculated simultaneously. K-means clustering is well known in the art and will not be described in detail here, apart from to state that the calculation is divided into an assignment step and an update step.

In the assignment step, an expression cluster e(i) is assigned to each utterance i using the following criterion:

$$e(i) = \underset{e_j: j=1,\ldots,k}{\operatorname{argmax}} \lambda_E^{(e_j)T} (y_E^{(i)} - X_{ES}^{(i)} \lambda_S^{(i)}) - \frac{1}{2} \lambda_E^{(e_j)T} X_{EE}^{(i)} \lambda_E^{(e_j)}. \quad \text{Eqn. 6}$$

In the update step, the expression CAT weight vector $\lambda_E^{(e_j)}$ is recalculated using the following equation:

$$\hat{\lambda}_E^{(e_j)} = \left( \sum_{i:i \in e_j} X_{EE}^{(i)} \right)^{-1} \sum_{i:i \in e_j} (y_E^{(i)} - X_{ES}^{(i)} \lambda_S^{(i)}).$$ Eqn. 7

The assignment step and update step are performed iteratively until convergence.

In this embodiment, expression clustering is based on the auxiliary function of SEF in which the speaker factor is explicitly removed; thus the speaker independent expression clustering can be achieved. The expression clustering and CAT weight vector estimation are integrated into a single process based on maximum likelihood criterion and there is no inconsistency in the training process and the expression clustering results are unaffected by speaker factors when dealing with multi-speaker data. The speaker information is explicitly isolated from the expression clustering process.

A method of training according to this embodiment is explained with reference to the flow diagrams of FIGS. 2 to 9.

Figure 2:
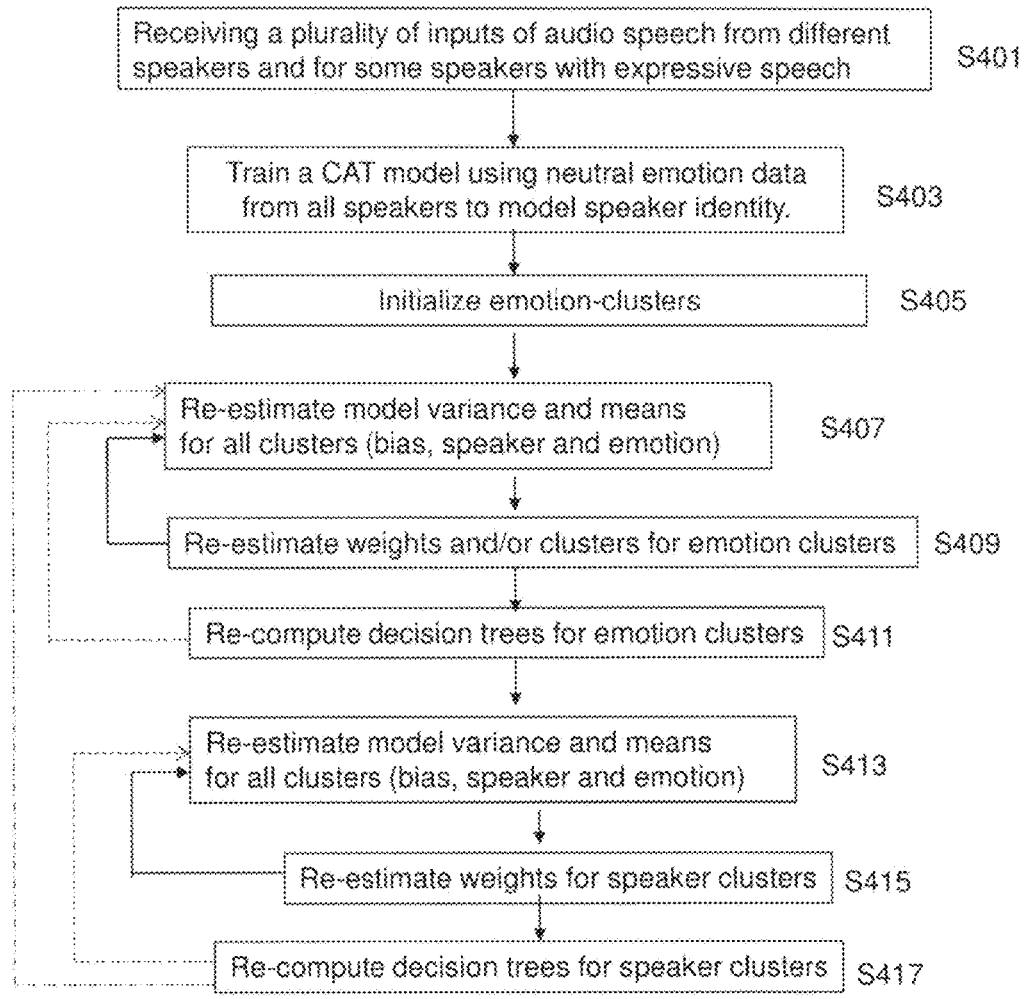
FIG. 2 is a flow diagram demonstrating a method of training a speech processing system in accordance with an embodiment.

In step S401 of FIG. 2, a plurality of inputs of audio speech are received. In this embodiment, audio speech for all speakers with neutral expression and some speakers speaking with different expression are received. In this illustrative example, 4 speakers are used.

Next, in step S403, an acoustic model is trained and produced for each of the 4 voices, each speaking with neutral expression. In this embodiment, each of the 4 models is only trained using data from one voice. S403 will be explained in more detail with reference to the flow chart of FIG. 3.

Figure 3:
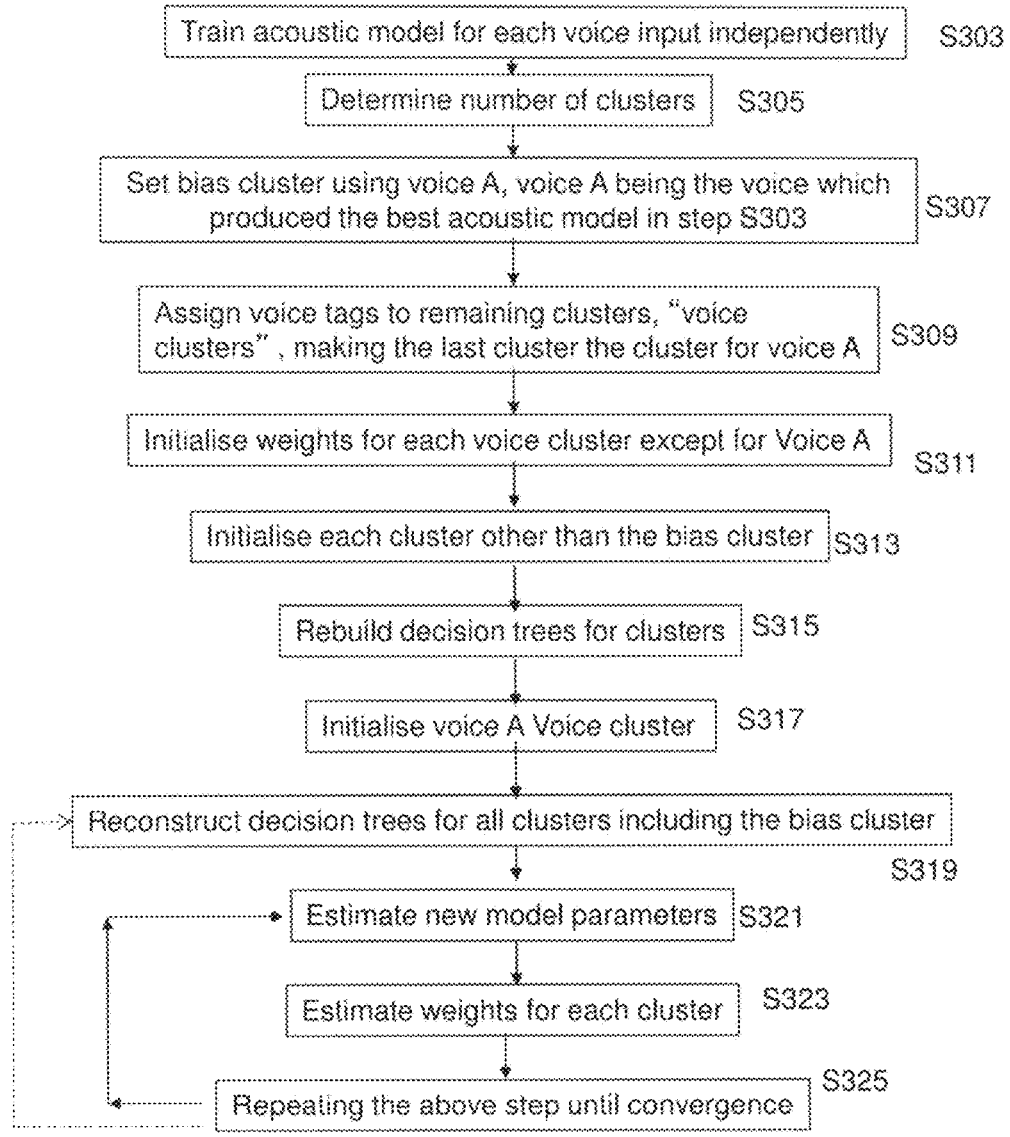
FIG. 3 is a flow diagram showing a step described with reference to FIG. 2.

In step S303 of FIG. 3, an acoustic model is trained and produced for each of the 4 voices. In this embodiment, each of the 4 models is only trained using data from one voice.

In step S305 of FIG. 3, the number of clusters P is set to V+1, where V is the number of voices (4).

In step S307, one cluster (cluster 1), is determined as the bias cluster. The decision trees for the bias cluster and the associated cluster mean vectors are initialised using the voice which in step S303 produced the best model. In this example, each voice is given a tag "Voice A", "Voice B", "Voice C" and "Voice D", here Voice A is assumed to have produced the best model. The covariance matrices, space weights for multi-space probability distributions (MSD) and their parameter sharing structure are also initialised to those of the voice A model.

Each binary decision tree is constructed in a locally optimal fashion starting with a single root node representing all contexts. In this embodiment, by context, the following bases are used, phonetic, linguistic and prosodic. As each node is created, the next optimal question about the context is selected. The question is selected on the basis of which question causes the maximum increase in likelihood and the terminal nodes generated in the training examples. This process is described in detail with reference to FIG. 26 in the appendix.

In step S309, a specific voice tag is assigned to each of 2, . . . , P clusters e.g. clusters 2, 3, 4, and 5 are for speakers B, C, D and A respectively. Note, because voice A was used to initialise the bias cluster it is assigned to the last cluster to be initialised.

In step S311, a set of CAT interpolation weights are simply set to 1 or 0 according to the assigned voice tag as:

$$\lambda_i^{(s)} = \begin{cases} 1.0 & \text{if } i = 1 \\ 1.0 & \text{if } voicetag(s) = i \\ 0.0 & \text{otherwise} \end{cases}$$ Eqn. 8

In this embodiment, there are global weights per speaker, per stream.

In step S313, for each cluster 2, . . . , (P−1) in turn the clusters are initialised as follows. The voice data for the associated voice, e.g. voice B for cluster 2, is aligned using the mono-speaker model for the associated voice trained in step S303. Given these alignments, the statistics are computed and the decision tree and mean values for the cluster are estimated. The mean values for the cluster are computed as the normalised weighted sum of the cluster means using the weights set in step S311 i.e. in practice this results in the mean values for a given context being the weighted sum (weight 1 in both cases) of the bias cluster mean for that context and the voice B model mean for that context in cluster 2.

In step S315, the decision trees are then rebuilt for the bias cluster using all the data from all 4 voices, and associated means and variance parameters re-estimated.

After adding the clusters for voices B, C and D the bias cluster is re-estimated using all 4 voices at the same time.

In step S317, Cluster P (voice A) is now initialised as for the other clusters, described in step S313, using data only from voice A.

Once the clusters have been initialised as above, the CAT model is then updated/trained as follows:

In step S319 the decision trees are re-constructed cluster-by-cluster from cluster 1 to P, keeping the CAT weights fixed. In step S321, new means and variances are estimated in the CAT model. Next in step S323, new CAT weights are estimated for each cluster. In an embodiment, the process loops back to S321 until convergence. The parameters and weights are estimated using maximum likelihood calculations performed by using the auxiliary function of the Baum-Welch algorithm to obtain a better estimate of said parameters.

As previously described, the parameters are estimated via an iterative process.

In a further embodiment, at step S323, the process loops back to step S319 so that the decision trees are reconstructed during each iteration until convergence.

The process then returns to step S405 of FIG. 2 where the model is then trained for expression. In this embodiment, expression in a speaker's voice is modelled using cluster adaptive training (CAT) in the same manner as described for modelling the speaker's voice instep S403. However, unlike the speaker voices, the expression information is unlabelled in the training data.

First, "expression clusters" are initialised in step S405. This will be explained in more detail with reference to FIG. 4.

Data is then collected for at least one of the speakers where the speaker's voice is expressive. It is possible to collect data from just one speaker, where the speaker provides a number of data samples, each exhibiting a different expressions or a plurality of the speakers providing speech data samples with different expressions. In this embodiment, it will be presumed that the speech samples provided to train the system to exhibit expression come from the speakers whose data was collected to train the initial CAT model in step S403.

In step S453 the expression clusters are initialized. In an embodiment, this is done using a process of automatic expression clustering with so-called supervised speaker and expression factorization. In an embodiment, acoustic feature based clustering is used. However, other methods or clustering could also be used. In acoustic feature based clustering, each speech vector is represented as an acoustic feature vector and clustering is performed according to criteria based on the distance measurement of feature vectors. In an embodiment, the training utterances $U=\{u_1, u_2 \ldots u_n\}$ are grouped into expression clusters $E=\{e_1, e_2, \ldots e_k\}$ according to the following criterion:

$$E = \underset{E}{\operatorname{argmin}} \sum_{i=1}^{k} \sum_{j \in e_i} \|v_j - c_i\|^2 \qquad \text{Eqn. 9}$$

where $v_1$ is the acoustic feature extracted from utterance j and $c_i$ is the mean value from cluster i.

Using these automatic clustering results as speaker labels, speaker and expression factorisation is carried out. Expression dependent parameters for each expression label are determined which maximize the likelihood of the training data, i.e $$\hat{\Lambda}^e(E) = \underset{\Lambda^e(E)}{\operatorname{argmax}} P(U \mid H; E, \Lambda^e(E), \Lambda^s, M) \qquad \text{Eqn. 10}$$

In step S455, unsupervised factorization is carried out in the initial expression subspace, i.e. the initial expression clusters E and expression dependent CAT weight vectors $\Lambda^e(E)$ determined in Step S453 are input into Eqn. 1. The expression clusters and expression dependent weight vectors are recalculated simultaneously using the k-means style clustering described in relation to Eqns. 6-7 above.

Next, the decision trees are built for each expression cluster in step S457. Finally, the weights are re-estimated based on all of the data in step S459.

After the expression clusters have been initialised as explained above, the Gaussian means and variances are re-estimated for all clusters, bias, speaker and expression in step S407.

In Step 409, in an embodiment, the expression clusters are held constant and the weights for the expression clusters are re-estimated such that they satisfy Eqn. 10. In another embodiment, both the expression weights and clusters are simultaneously re-estimated such that they satisfy Eqn. 1. In either embodiment, the decision trees are then re-computed in step S411. Next, the process loops back to step S407 and the model parameters, followed by the weightings or weightings and clusters in step S409, followed by reconstructing the decision trees in step S411 are performed until convergence. In an embodiment, the loop S407-S411 is repeated several times.

Next, in step S413, the model variance and means are re-estimated for all clusters, bias, speaker and expression. In step S415 the weights are re-estimated for the speaker clusters and the decision trees are rebuilt in step S417. The process then loops back to step S413 and this loop is repeated until convergence. Then the process loops back to step S407 and the loop concerning expressions is repeated until convergence. The process continues until convergence is reached for both loops jointly.

In the above embodiment, after the expression CAT weights and cluster models are trained, the speaker CAT weight vectors and cluster models are re-estimated in similar fashion. If there is limited time for computing, however, this step can be skipped. In this embodiment, the process comprises the following steps:

1. Construct speaker cluster models using the selected neutral speech, iteratively updating the speaker decision trees, speaker CAT weight vectors and speaker cluster models until convergence.
2. Using acoustic feature based expression clustering, group the training speech into PE clusters, where PE is the dimension of expression CAT weight vectors.
3. Keep the speaker CAT weight vectors fixed. For each expression cluster, set CAT weight to one for that cluster and zero otherwise
4. Construct the decision tree for each expression cluster.
5. For each discrete expression state, re-estimate the expression CAT weight vector, based on equation 10.
6. Update cluster model parameters for all the clusters.
7. Goto 4 until convergence.
8. For each utterance i, accumulate the expression statistics $X_{EE}^{(i)}$, $X_{ES}^{(i)}$, and $y_E^{(i)}$ as equation 2.
9. K-means style clustering, re-do the expression clustering and expression CAT weight estimation based on ML criterion.
10. Re-construct the decision tree for each expression cluster.
11. Re-estimate the expression CAT weight vector, with the fixed speaker CAT weight vectors.
12. Update cluster model parameters for all the clusters.
13. go to 10 until convergence.

In the training process described above, steps 2-7 perform a process of expression clustering plus supervised SEF. This process constructs an initial expression space and sufficient statistics for unsupervised SEF are accumulated based on this initial expression space in step 8. Finally, the unsupervised SEF training is performed in steps 9 to 13.

In another embodiment unsupervised SEF is implemented using CMLLR based factorization. In this embodiment, the auxiliary function, Eqn. 49 (see appendix) becomes:

$$Q(\hat{W}_E; W_E, W_s) = \qquad \text{Eqn. 11}$$

$$-\frac{1}{2} \sum_{j=1}^{k} \sum_{i:i \in e_j} \sum_{m} \sum_{t \in T_i} \gamma_m(t) \Big[ -\log(|A|^2) + Tr\big[ P^{(m,s(t))} (\hat{W}\zeta(t) - \mu^{(m,s(t))}) (\hat{W}\zeta(t) - \mu^{(m,s(t))})^T \big] \Big] =$$

$$\sum_{j=1}^{k} \sum_{i:i \in e_j} \left( \beta(i) \log(|\hat{A}_E^{e_j}|) + \sum_l \hat{w}_E^{e_j}(i, l) k_E(l) \right) - \frac{1}{2} \sum_{l,n} \hat{w}_E^{e_j}(l) G_E(i, l, n) \hat{w}_E^{e_j}(l)^T \Bigg).$$

Where s(i) is the speaker index of utterance i and $P^{(m,s(i))}$ and $\mu^{(m,s(i))}$ are the precision matrix and mean vector of Gaussian component m which are transformed by speaker dependent transforms $A_s^{s(i)}$ respectively, i.e.

$$P^{(m,s(i))} = A_s^{s(i)T} \Sigma^{(m)-1} A_s^{s(i)} \qquad \text{Eqn. 12.}$$

$$\mu^{(m,s(i))} = A_s^{s(i)-1}(\mu^{(m)} - b_s^{s(i)}) \qquad \text{Eqn. 13.}$$

The sufficient statistics $\beta(i), k_E(i,l), G_E(i,l,n)$ are defined as:

$$\beta(i) = \sum_m \sum_{t \in T_i} \gamma_t^{(m)}, \qquad \text{Eqn. 14}$$

$$k_E(i, l) = \sum_m p^{(m,s(i))}(l) \mu^{(m,s(i))} \sum_{t \in T_i} \gamma_t^{(m)} \varsigma_t, \qquad \text{Eqn. 15}$$

$$G_E(i, l, n) = \sum_m p^{(m,s(i))}(l, n) \sum_{t \in T_i} \gamma_t^{(m)} \varsigma_t \varsigma_t^T. \qquad \text{Eqn. 16}$$

Similar to the CAT based factorisation described above, a k-means style algorithm can be employed to find a partition of the training data $\hat{E}$ according to the expression and the CMLLR transform associated with this partition $\hat{W}_E(\hat{E})$ so that the auxiliary function is maximized.

In the assignment step, for each utterance i, an expression cluster e(i) is assigned to it by:

$$e(i) = \underset{e_j \in l, \ldots, k}{\operatorname{argmax}} \beta(i) \log(|A_E^{e_j}|) + \qquad \text{Eqn. 17}$$

$$\sum_l w_E^{e_j}(i, l) k_E(l) - \frac{1}{2} \sum_{l,n} w_E^{e_j}(l) G_E(i, l, n) w_E^{e_j}(l)^T.$$

In the update step, the CMLLR transforms for each expression cluster can be estimated as:

$$\hat{w}_E^{e_j}(l) = (\alpha c_E^{e_j} + \nu_E^{e_j}(l)) U_E^{e_j}(l,l)^{-1} \qquad \text{Eqn. 18.}$$

Where α is the root of the quadratic equation:

$$\alpha^2 c_E^{e_j} U_E^{e_j}(l,l)^{-1} c_E^{e_j T} + \alpha c_E^{e_j} U_E^{e_j}(l,l)^{-1} \nu_E^{e_j}(l)^T - \beta^{e_j} = 0 \qquad \text{Eqn. 19.}$$

The statistics $\beta^{e_j}$, $\nu_E^{e_j}(l)$ and $U_E^{e_j}(l)$ are defined as:

$$\beta^{e_j} = \sum_{i:i \in e_j} \beta(i), \qquad \text{Eqn. 20}$$

$$U_E^{e_j}(l, n) = \sum_{i:i \in e_j} G_E(i, l, n), \qquad \text{Eqn. 21}$$

$$\nu_E^{e_j}(l) = \sum_{i:i \in e_j} k_E(i, l) - \sum_{n:n \neq l} \hat{w}_E^{e_j}(n) U_E^{e_j}(n) U_E^{e_j}(l, n). \qquad \text{Eqn. 22}$$

Figure 5:
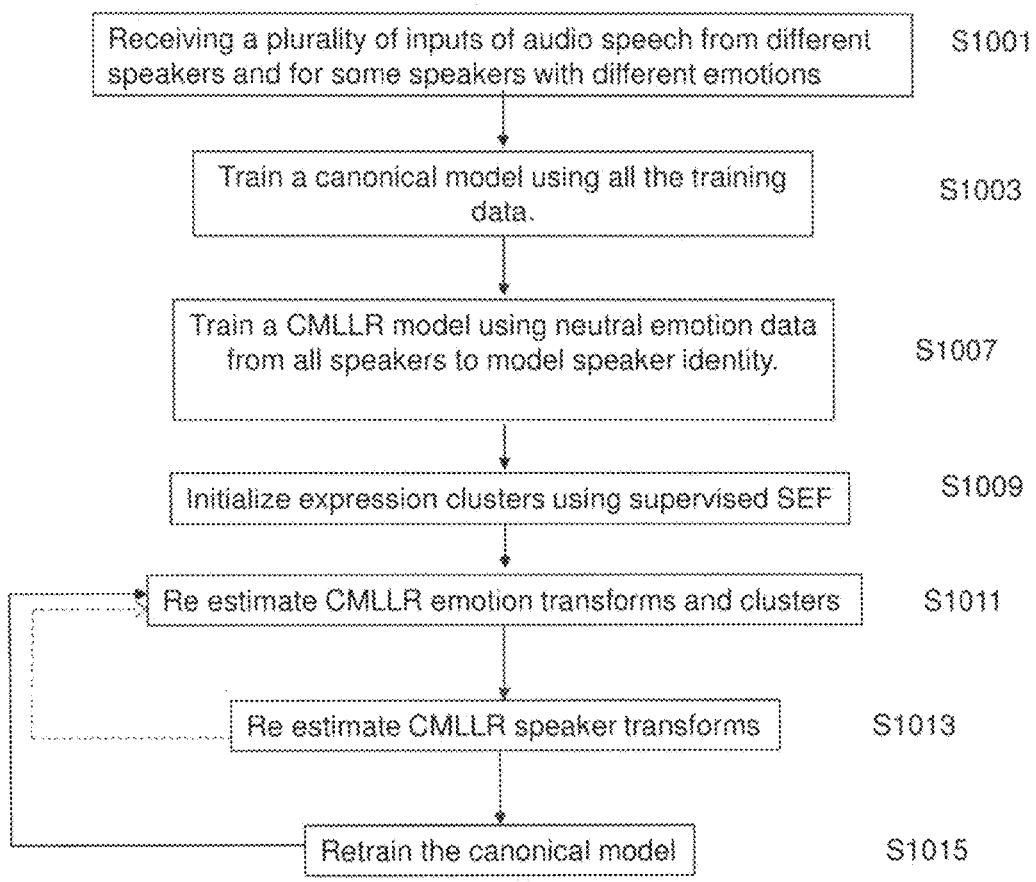
FIG. 5 is a flow diagram demonstrating a method of training a speech processing system in accordance with an embodiment.

A method of training according to this embodiment is explained with reference to the flow diagrams of FIG. 5.

In step S1001, a plurality of inputs of audio speech are received. In this embodiment, audio speech for speakers with neutral expression and some speakers speaking with different expressions are received.

Next, in step S1003, an acoustic model is trained using all the training data. This acoustic model becomes the canonical model. Training a canonical model in this way is well known in the art and will not be discussed here.

In Step S1007, CMLLR transforms are estimated for each voice speaking with neutral expression. This is described in relation to Eqns 61-68 in the appendix.

In Step S1009 the expression clusters are initialized. In an embodiment, this is done using the technique of supervised speaker speaker and expression factorization. This comprises automatic expression clustering as described above in relation to Eqn. 9. Once the expression clusters have been determined in this way, the initial expression CMLLR transforms are estimated using the standard CMLLR technique in relation to equations 61 to 68 in the appendix.

In Step S1011, unsupervised speaker and expression factorization is performed. The expression clustering and CMLLR expression transforms are estimated simultaneously using Eqn. 1.

In Step 1013, the speaker transforms are re-estimated using eqns 61 to 68.

Next the process loops back to step S1011 and this loop is repeated until convergence. In an embodiment, the loop S1011-S1013 is repeated several times.

Next the canonical model is retrained in Step S1015.

The process loops back to step S1011 and this loop is repeated until convergence. The loop S1011-1015 is then repeated several times.

In another embodiment, a combination of CAT and CMLLR is employed to train the model.

As an example, we discuss the case where CAT is employed to model expression and CMLLR is used to model speaker. However the reverse combination is also possible in accordance with this embodiment.

In this example, the auxiliary function becomes:

$$Q(\hat{\Lambda}_E; \Lambda_E, W_S) = \sum_{j=1}^k \sum_{i:i \in e_j} \left( \hat{\lambda}_E^{(e_j)T} z_E^{(i)} - \frac{1}{2} \hat{\lambda}_E^{(e_j)T} X_E^{(i)} \hat{\lambda}_E^{(e_j)} \right), \qquad \text{Eqn. 23}$$

where $$X_E^{(i)} = \sum_{m,t \in T_t} \gamma_t^{(m)} M^{(m)T} \Sigma^{(m)-1} M^{(m)}, \qquad \text{Eqn. 24}$$

$$z_E^{(i)} = \sum_m M^{(m)T} \Sigma^{(m)-1} \sum_{t \in T_i} \gamma_t^{(m)} (A_S^{s(i)} o_t + b_S^{s(i)} - \mu^{(m,l)}). \qquad \text{Eqn. 25}$$

Again, a k-means style algorithm is used to perform the parameter estimation of unsupervised SEF. In an assignment step, for each utterance i, an expression cluster e(i) is assigned to it by:

$$e(i) = \underset{e_j : j=1, \ldots k}{\operatorname{argmax}} \lambda_E^{(e_j)T} z_E^{(i)} - \frac{1}{2} \lambda_E^{(e_j)T} X_E^{(i)} \lambda_E^{(e_j)}. \qquad \text{Eqn. 26}$$

In the update step, the expression CAT weight vector for each expression cluster is recalculated using:

$$\hat{\lambda}_E^{(e_j)} = \left( \sum_{i:i \in e_j} X_E^{(i)} \right)^{-1} \left( \sum_{i:i \in e_j} z_E^{(i)} \right). \qquad \text{Eqn. 27}$$

Figure 6:
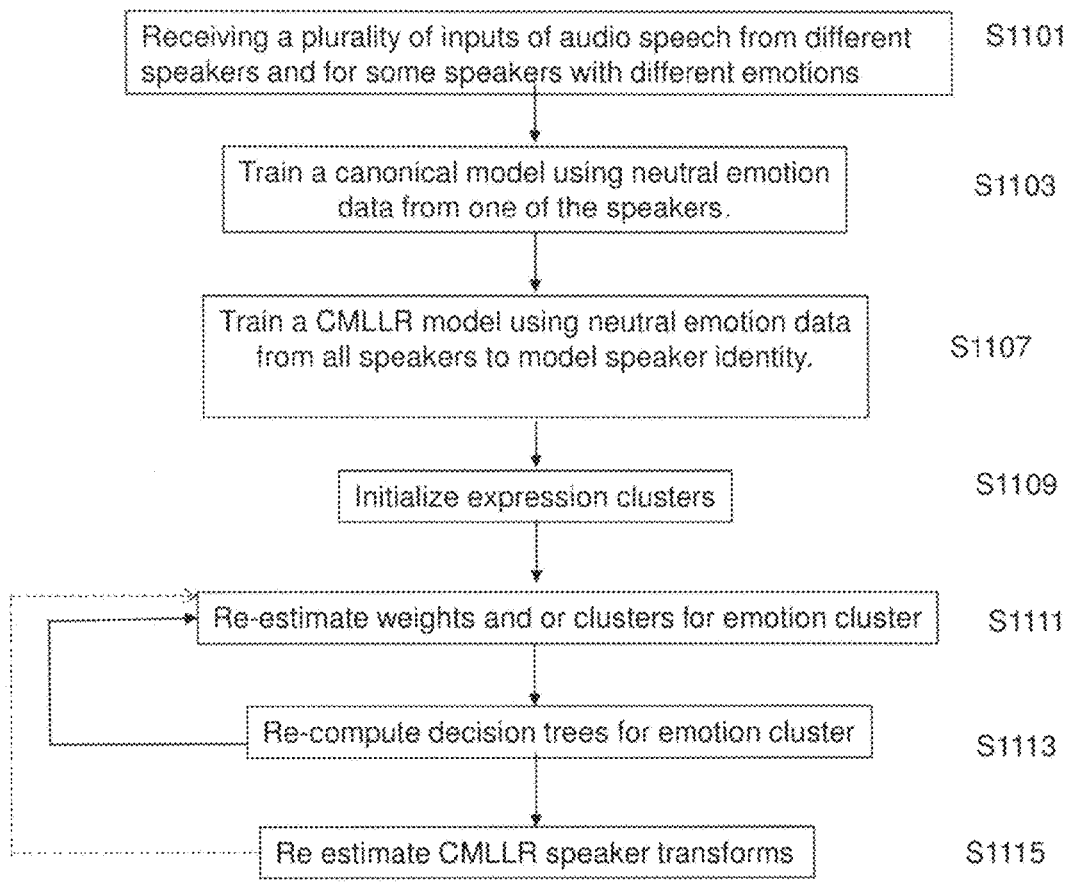
FIG. 6 is a flow diagram demonstrating a method of training a speech processing system in accordance with an embodiment.

A method of training according to this embodiment is explained with reference to the flow chart of FIG. 6.

In Step S1101 a plurality of inputs of audio speech are received. In this embodiment, audio speech for all speakers with neutral expression and some speakers speaking with different expression are received.

Next, in step S1103, an acoustic model is trained using all the training data from speakers speaking with neutral expression. This acoustic model becomes the canonical model.

In Step S1107, CMLLR transforms are estimated for all the voices speaking with neutral expression. This is performed in accordance with the method described in relation to Eqns 61 to 68 in the appendix.

In Step S1109 expression clusters are initialized. This proceeds according to the method described in relation to the flow diagram of FIG. 4.

In an embodiment, in step S1111, the initialized expression clusters are held constant and the CAT weights for the expression clusters are re-estimated to satisfy Eqn. 10. In another embodiment, both the expression weights and clusters are simultaneously re-estimated in step S1111 to satisfy Eqn. 1. In either embodiment, the decision trees are then re-computed in step S1113. Next, the process loops back to step S1111 and the process of estimating of the model parameters, followed by reconstructing the decision trees in step S1113 is performed until convergence. In an embodiment, the loop S1111-S1113 is repeated several times.

Next, in step S1115, the CMLLR speaker transforms are recalculated. The process then loops back to step S1111. In an embodiment, the loop S1111-S1115 is repeated several times.

Above, we have described embodiments employing three methods of factorization: CAT, CMLLR and a combination of CAT and CMLLR. However, the method of unsupervised SEF can be applied to any method of maximum-likelihood based factorization. The general case will be described below.

The auxiliary function of general maximum-likelihood factorization can be expressed as:

$$Q(\hat{\Gamma}_E; \Gamma_S, \Gamma_E) = \sum_{j=1}^{k} \sum_{i:i \in e_j} \sum_{m,t \in T_i} \gamma_i^{(m)} \log p(o_t | \hat{\Gamma}_E, \Gamma_S; \Phi^{(m)}),$$ Eqn. 28 where $\Gamma_S$ and $\Gamma_E$ represent the speaker dependent parameters and expression dependent parameters respectively. The form of $\Gamma_S$ and $\Gamma_E$ will differ for different types of model. For example, for CAT, they are CAT weight vectors. For CMLLR, they are CMLLR transforms and for the combination of both methods described above $\Gamma_S$ is the CMLLR transform and $\Gamma_E$ is the CAT weight vector. $\Phi^{(m)}$ are the Gaussian parameters for component m. $\Phi^{(m)}$ consists of a mean vector matrix and a covariance matrix in the CAT method. For normal HMMs, however, it comprises a mean vector and a covariance matrix. Eqn 28 can then be written as:

$$Q(\hat{\Gamma}_E; \Gamma_S, \Gamma_E) = \sum_{j=1}^{k} \sum_{i:i \in e_j} \tilde{Q}(\hat{\Gamma}_E^{e_j}, \Delta_E(i, \Gamma_S)),$$ Eqn. 29 where $\Delta_E(i, \Gamma_S)$ are the sufficient statistics of utterance i for expression estimation. In the CAT method described above, the sufficient statistics were $X_{EE}^{(i)}$, $X_{ES}^{(i)}$ and $y_E^{(i)}$. In the CMLLR case, they were given by $\beta(i)$, $k_E(i,l)$ and $G_E(i,l,n)$. In the combination of CMLLR and CAT, as described above, they become $X_E^{(i)}$ and $z^{(i)}$. Note that $\Delta_E(i,\Gamma_S)$ is a function of the speaker dependent parameter $\Gamma_S$ as the speaker factor must be explicitly removed from the calculation of $\Delta_E(i,\Gamma_S)$.

In this general embodiment, a k-means style algorithm can be described as follows:

In the assignment step, an expression cluster e(i) is assigned to each utterance i as follows:

$$e(i) = \underset{e_j \in 1,\ldots,k}{\operatorname{argmax}} Q^{(i)}(\hat{\Gamma}_E^{e_j}, \Delta_E(i, \Gamma_S)).$$ Eqn. 30

In the update step, $\hat{\Gamma}_E^{e_j}$ is estimated as:

$$\hat{\Gamma}_E^{e_j} = \underset{\Gamma}{\operatorname{argmax}} \tilde{Q}\left(\hat{\Gamma}_E^{e_j}, \sum_{i:i \in e_j} \Delta_E(i, \Gamma_S)\right).$$ Eqn. 31

The framework of the above embodiments is general and can be implemented using various techniques of factorization with maximum-likelihood criteria. Although the examples given above related to the factorization of speaker and expression, in an embodiment, the same technique is employed with more than two factors, for example noise environment, speaker and expression. In an embodiment with three factors, CAT based factorization can be achieved using the following expression:

$$p(o_t|\lambda_{s,e}, M_{s,e}^{(m)}) = N(o_t;\mu^{(m,J)} + M_s^{(m)}\lambda_s + M_N^{(m)}\lambda_N + M_E^{(m)}\lambda_E; \Sigma^{(m)})$$ Eqn. 32.

where N indicates the noise environment.

In this embodiment, the auxiliary equation, Eqn. 49, can then be re-written as:

$$Q(\hat{\Lambda}_E; \Lambda_E, \Lambda_S) =$$ Eqn. 33

$$\sum_{j=1}^{k} \sum_{i:i \in e_j} \left(\tilde{\lambda}_E^{(e_j)T}(y_E^{(i)} - X_{ES}^{(i)}\lambda_S^{(i)} - X_{EN}^{(i)}\lambda_N^{(i)}) - \frac{1}{2}\tilde{\lambda}_E^{(e_j)T}X_{EE}^{(i)}\tilde{\lambda}_E^{(e_j)}\right),$$

where $\lambda_N^{(i)}$ is the CAT weight vector for noise and $$X_{EN}^{(i)} = \sum_{m,i \in T_i} \gamma_i^{(m)} M_E^{(m)T} \Sigma^{(m)-1} M_N^{(m)}.$$

In an embodiment, the expression parameters are then estimated using the k-mean style algorithm described in detail above.

In the embodiments described above, the expression information in the speech data is unlabelled whereas the speaker data is labelled. In an embodiment, however, more than one speech factor may be unlabelled. For example, both speaker and expression may be unlabelled.

When the speaker and the expression are unlabelled, it is not possible to estimate the speaker transforms and the expression transforms simultaneously. Instead, they must be updated in an iterative fashion.

In this embodiment, the expression clustering and expression dependent parameters are calculated simultaneously using the auxiliary function Eqn. 2. The corresponding expression for calculating speaker clustering and speaker dependent parameters is:

$$Q(\hat{\Lambda}_S; \Lambda_S, \Lambda_E) =$$ Eqn. 34

$$\sum_{j=1}^{t} \sum_{i \in e_j} \left(\tilde{\lambda}_S^{(s_j)T}(y_S^{(i)} - X_{SE}^{(i)}\lambda_E^{(i)} - X_{SN}^{(i)}\lambda_N^{(i)}) - \frac{1}{2}\tilde{\lambda}_S^{(s_j)T}X_{SS}^{(i)}\tilde{\lambda}_S^{(s_j)}\right).$$

Figure 7:
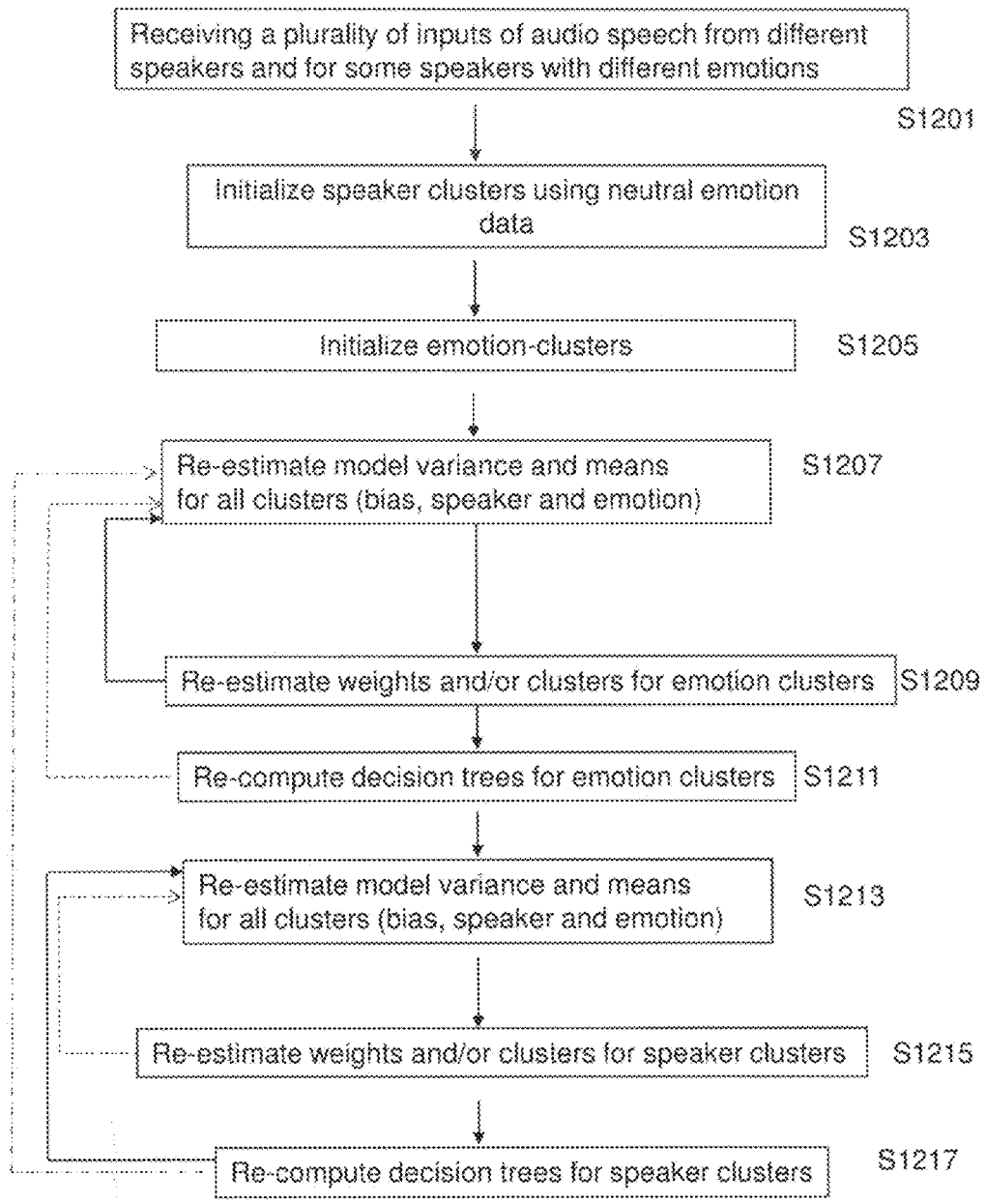
FIG. 7 is a flow diagram demonstrating a method of training a speech processing system in accordance with an embodiment.

A flow diagram of a model in accordance with an embodiment when the system is provided with speech data which is unlabelled for both speaker and expression is shown in FIG. 7. This figure corresponds to a CAT approach to factorization of both the speaker and expression data. However, CMLLR or other approaches based on ML criteria could also be used in accordance with the present embodiment.

In Step S1201, a plurality of inputs of audio speech are received. In this embodiment, audio speech for all speakers with neutral expression and some speakers speaking with different expression are received.

Figure 8:
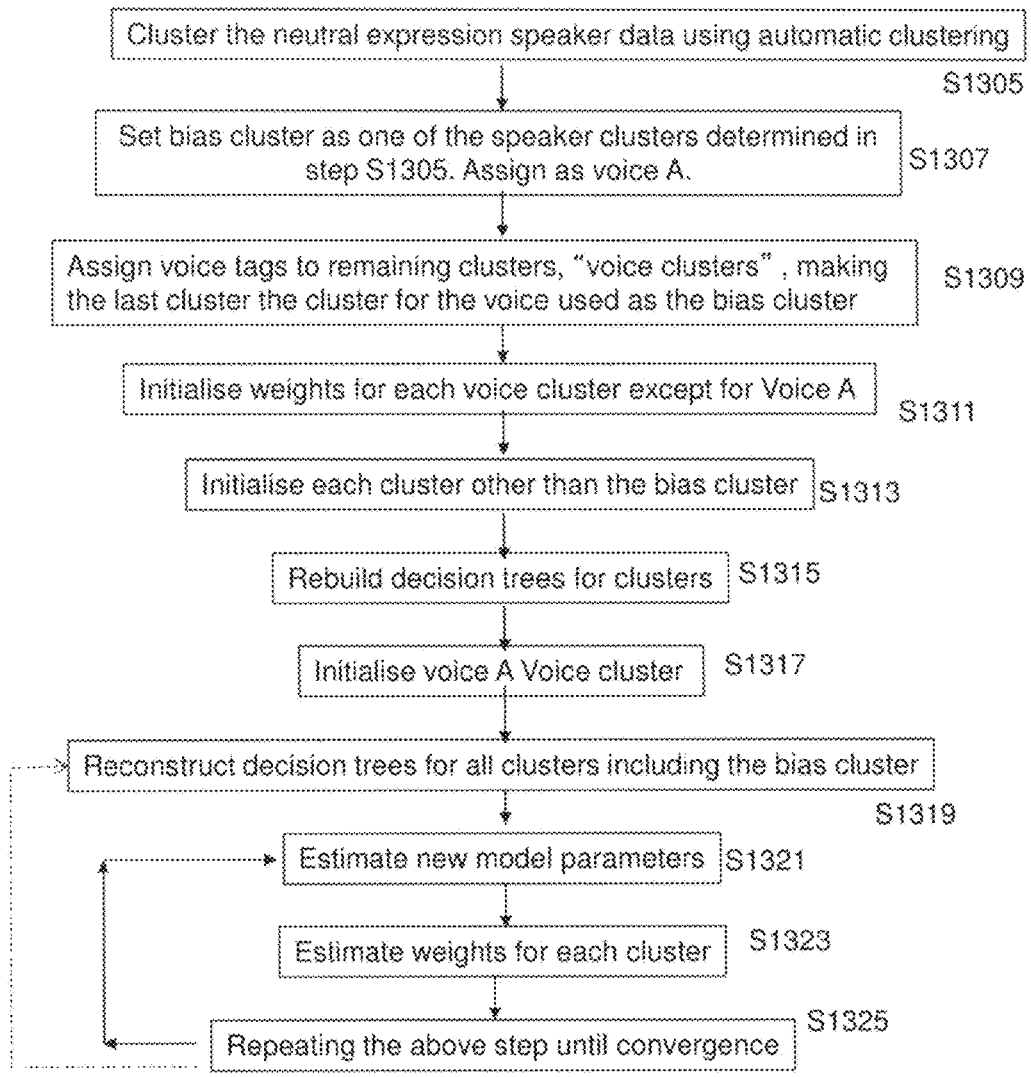
FIG. 8 is a flow diagram showing a step described with reference to FIG. 7.

In S1203, the speaker clusters are initialized. A flow chart for the speaker cluster initialization is shown in FIG. 8. In step S1305, an automatic clustering method is used to obtain the initial speaker clusters $S=\{s_1, s_2, \ldots, s_k\}$. When the speaker information is unknown, automatic speaker adaptation methods are used to automatically assign speaker ID to each training utterance. Automatic speaker clustering methods are numerous and well known in the art. In one example, clustering is performed according to criteria based on the distance measurement of speech vectors according to the following equation:

$$S = \operatorname*{argmin}_{S} \sum_{i=1}^{k} \sum_{j \in s_i} \|v_j - c_i\|^2. \qquad \text{Eqn. 35}$$

In step S1307, one of the speaker clusters is assigned as the bias cluster.

In step 1309, a voice tag is assigned to each of the clusters. The voice tag corresponding to the speaker cluster used to initialize the bias cluster is assigned to the last cluster to be initialized.

Steps S1311-S1325 proceed as steps S311-S325 of FIG. 3.

Figure 4:
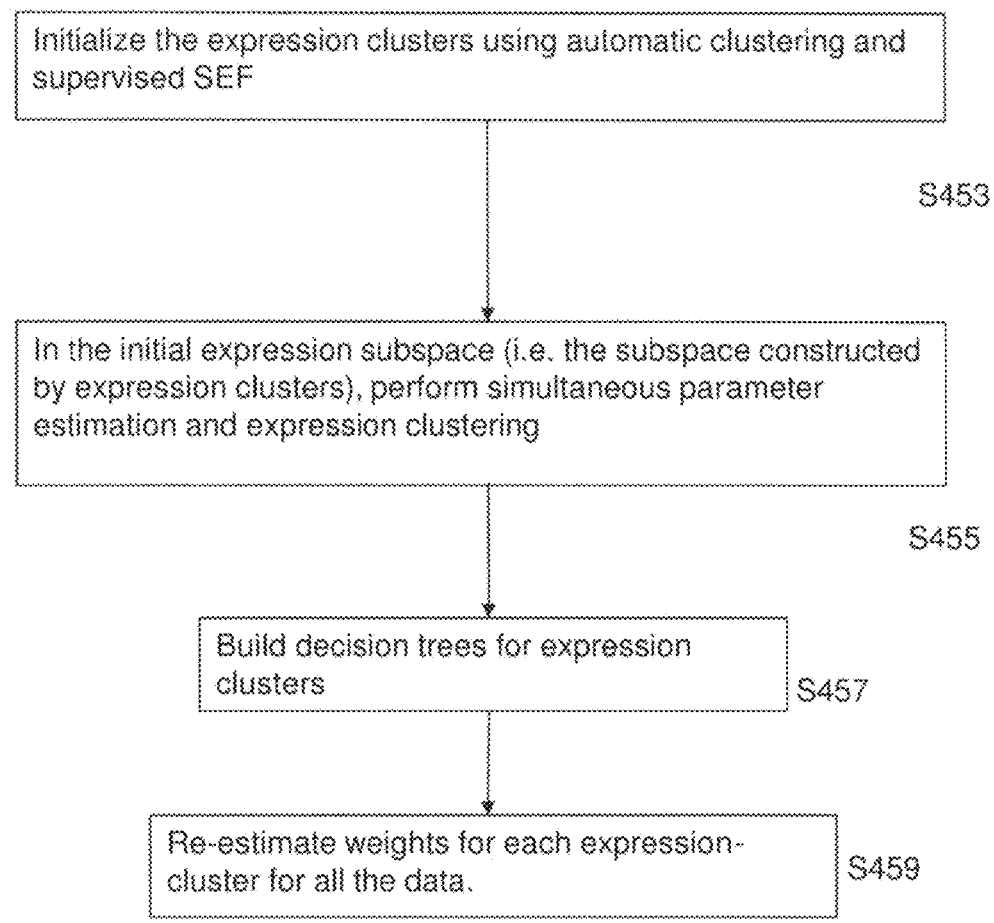
FIG. 4 is a flow diagram showing another step described with reference to FIG. 2.

Returning now to FIG. 7, In Step S1205 the speaker clusters and parameters are held constant and the expression clusters are initialized as described in FIG. 4.

After the expression clusters have been initialized, the Gaussian means and variances are re-estimated for all clusters, bias, speaker and expression in step S1207.

In an embodiment, in step S1209 the expression and speaker clusters are held constant and the weights for the expression clusters are re-estimated using Eqn. 10. In another embodiment, the speaker clusters are held constant while both the expression weights and clusters are simultaneously re-estimated using Eqn. 1. This comprises maximizing Eqn 2.

In either embodiment, the decision trees are recomputed in step S1211.

Next the process loops back to S1207 and the model parameters, followed by the expression weightings in step S1209, followed by reconstructing the decision trees in step S1211 are performed until convergence. In an embodiment, the loop S1207-S1209 is repeated several times.

Next in step S1213, the model variance and means are re-estimated for all clusters, bias, speaker and expression. In step S1215, the weights and/or clusters are re-estimated for the speaker clusters and the decision trees are rebuilt in step S1217. The expression clusters and transforms are held constant and Eqn 34 is maximized in order to obtain the new speaker clusters and transforms.

The process then loops back to step S1213 and this loop is repeated until convergence. Then the process loops back to step S1207 and the loop concerning expressions is repeated until convergence. The process continues until convergence is reached for both loops jointly.

Next, the text-to speech synthesis by a system trained in accordance with an embodiment will be described with reference to FIG. 9.

Figure 9:
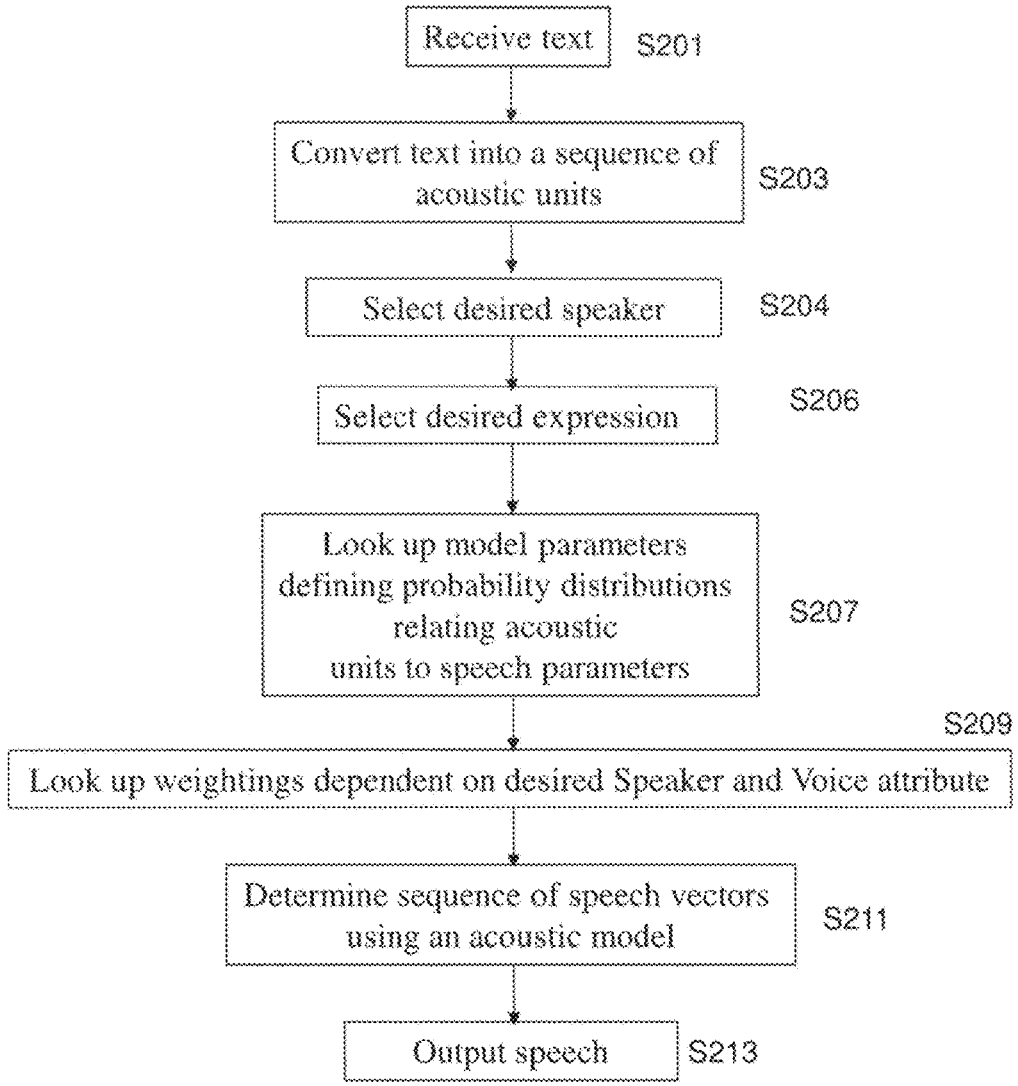
FIG. 9 is a flow diagram of a speech processing method in accordance with an embodiment.

FIG. 9 is a flowchart of a process for a text to speech system trained in accordance with an embodiment.

In step S201, text is inputted. The text may be inputted via a keyboard, touch screen, text predictor or the like.

In step S203, the text is then converted into a sequence of acoustic units. These acoustic units may be phonemes or graphemes. The units may be context dependent e.g. triphones which take into account not only the phoneme which has been selected but the proceeding and following phonemes. The text is converted into the sequence of acoustic units using techniques which are well-known in the art and will not be explained further here.

In step S204, the desired speaker is selected.

In step S206, the desired expression is selected.

Expression and speaker selection may be performed in a number of ways. This will be discussed below in relation to FIGS. 11-21.

In step S206, the system looks up the means and variances which will be stored in an accessible manner.

In step S209, the system looks up the parameters for the desired speaker and attribute. In the case of the CAT trained system, this will comprise weightings for the means and variances. In the CMLLR trained system this will comprise transforms for the means and variances of the canonical model. It will be appreciated by those skilled in the art that the speaker and attribute dependent parameters may be looked up before or after the means are looked up in step S207.

Thus, after step S209, it is possible to obtain speaker and attribute dependent means i.e. using the means and applying the parameters, these are then used in an acoustic model in step S211. The speech is then output in step S213.

In case where the training data was labelled the relevant speaker or expression can be straightforwardly selected from the speakers and/or expressions used to train the model. This is because the speaker transforms or cluster weights are known for the training speakers and expressions. For example, this may be done via a user interface such as that shown in FIG. 10. Here, the display 253 shows different expressions which may be selected by selecting unit 251. A similar user interface could be used to select different speakers. It will be appreciated by those skilled in the art that other display methods may be used.

However, in case where the expression and/or speaker information in the training data is unlabelled, such an approach is not possible as the relevant transforms or cluster weights are also unlabelled for speaker and/or expression. This is also the case if a new speaker or a new expression for which the model has not been trained is desired.

Figure 10:
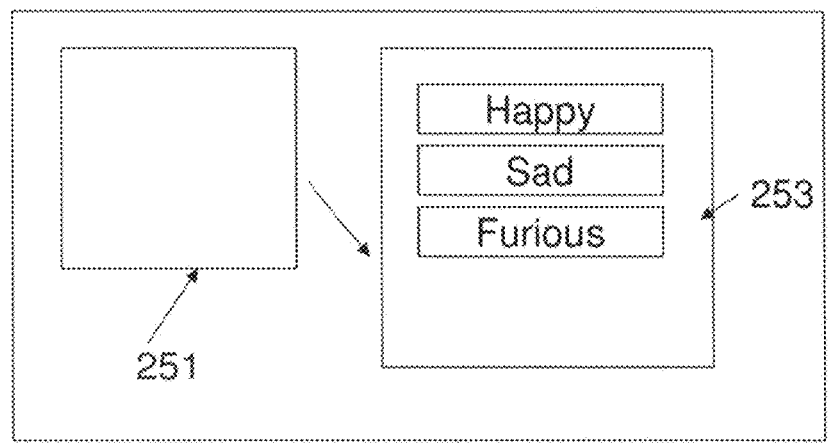
FIG. 10 is a schematic of a system showing how voice characteristics may be selected.
Figure 11:
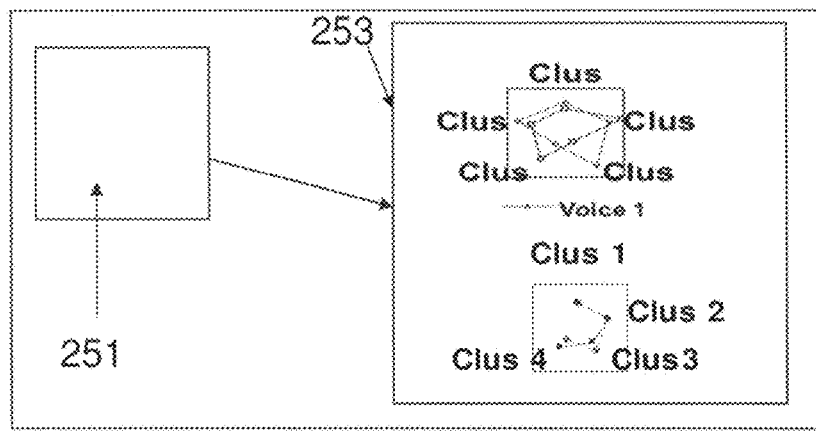
FIG. 11 is a variation on the system of FIG. 10.

In one embodiment, the speaker and expression selection is performed manually via a user interface. In the user interface of FIG. 10, a user directly selects the speaker or expression-dependent parameters using, for example, a mouse to drag and drop a point on the screen, a keyboard to input a figure etc. In FIG. 10, a selection unit 251 which comprises a mouse, keyboard or the like selects the parameters using display 253. Display 253, in this example has 2 radar charts, one for expression and one for voice which shows the parameters. The user can use the selecting unit 251 in order to change between parameters correspond to the various (unlabelled) clusters. In the CAT training method, where the parameters are cluster weightings, this selecting unit will change the dominance of the various clusters via the radar charts. In the CMLLR training method, where parameters are speaker and expression transforms, the selection unit will select different transforms. It will be appreciated by those skilled in the art that other display methods may be used.

In another embodiment, the CMLLR transforms or CAT cluster weights for specific speakers or expressions must be obtained by adapting the model to labelled adaptation data.

Note that the amount of training data required to train the model is very large. Therefore, it may be difficult and expensive to label the training data. However, the amount of data required for adaptation is small. Labelling of adaptation data is therefore cheap. For new speakers, only a small amount of neutral speech is need to perform the speaker adaptation, while the expression information extracted from the adaptation data can be shared by any new speaker.

In one embodiment, adaptation data is input in order to select the desired speaker or expression. In an embodiment, the adaptation data comprises audio data.

Figure 12:
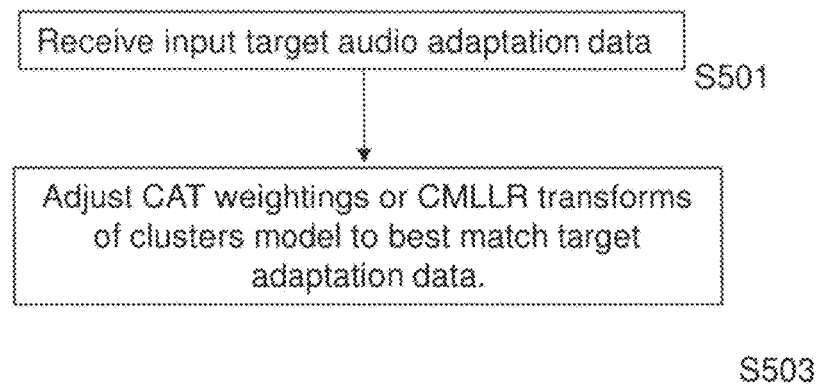
FIG. 12 is a flow diagram showing the adapting of a system in accordance with an embodiment.

FIG. 12 shows one example of the system adapting to a known speaker and/or expression provided with audio data. First, the input target adaptation audio data is received at step 501.

If the system is being adapted for expression, unless the speaker of the audio data is one of the speakers used for training the model, a sample of the speaker speaking with neutral emotion must also be input. Note, however, that the speaker of the audio expression data does not have to correspond to the desired speaker for output of the synthesised speech; the expression data may be "transplanted" from one speaker to another independently of the speaker data. This is discussed in detail below.

Next, the CAT weightings of the canonical model i.e. the weightings of the clusters which have been previously trained, or the CMLLR transforms, as appropriate, are adjusted to best match the target adaptation data in step 503. This process comprises maximizing the likelihood of the adaptation data. The speaker cluster weightings are adjusted to match the speaker of the neutral audio data. The emotion cluster weightings are then adapted to match the expression data.

Figure 13:
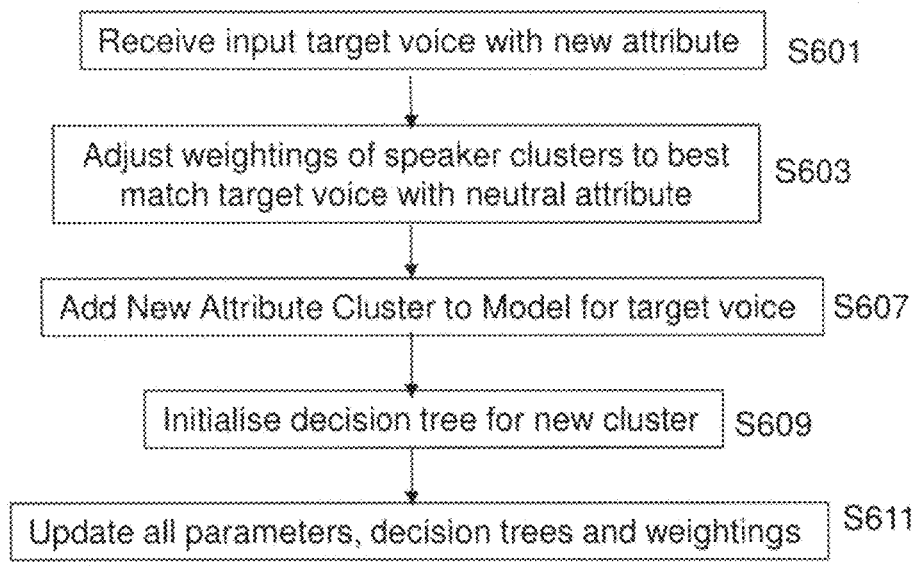
FIG. 13 is a flow diagram showing the adapting of a system in accordance with a further embodiment.
Figure 14:
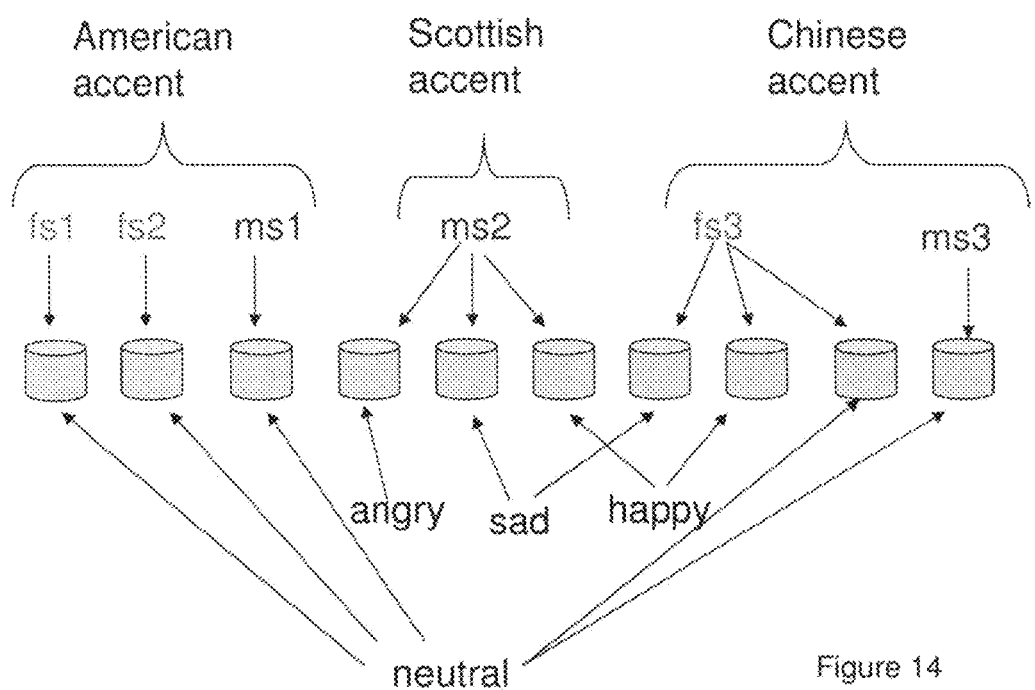
FIG. 14 is a schematic showing a collection of different types of data suitable for adapting a system.

In another embodiment, adaptation of a CAT model to audio adaptation data may proceed as explained with reference to FIG. 13.

As in FIG. 12, first, a target voice is received in step S601, the data is collected for the voice speaking with the target expression. First, the weightings for the neutral speaker clusters are adjusted to best match the target voice in step S603.

Then, a new expression cluster is added to the existing expression clusters for the target expression in step S607. Next, in step S609, the decision tree for the new cluster is initialised as described with relation to FIG. 4 from step S455 onwards. The weightings, model parameters and trees are then re-estimated and rebuilt for all clusters as described with reference to FIG. 2 in Step S611.

Any of the speaker voices which may be generated by the system can be output with the target expression. Likewise any of the expressions which may be generated by the system can be output with the target speaker voice.

Note that the speaker or expression to which the model is adapted can be either a speaker or expression for which the model has been trained or it may be a new speaker or expression.

Systems trained according to an embodiment allow the following synthesis to be performed:

1. Any of the speaker voice can be synthesised using the final set of speaker parameters corresponding to that voice in combination with any attribute such as expression for which the system has been adapted according to the adaptation method described above in relation to FIG. 13 or 14. Thus, in the case that only "happy" data exists for speaker 1, providing that the system has been adapted with "angry" data for at least one of other voices, it is possible for system to output the voice of speaker 1 with the "angry expression".
2. In a system trained by CAT, a random voice can be synthesised from the acoustic space spanned by the CAT model by setting the weight vectors to arbitrary positions and any of the attributes to which the model has been adapted can be applied to this new voice.
3. The system may also be used to output a voice with 2 or more different attributes. For example, a speaker voice may be outputted with 2 different attributes, for example an expression and an accent.

To model different attributes which can be combined such as accent and expression, the two different attributes to be combined are incorporated as described in relation to equation 32 above.

In such an arrangement, one set of clusters will be for different speakers, another set of clusters for expression and a final set of clusters for noise. In an embodiment, CAT factorization is employed. Referring back to FIG. 2, the expression clusters will be initialised as explained with reference to FIG. 4, the noise clusters will also be initialised as an additional group of clusters as explained with reference to FIG. 4 as for expression. In FIG. 2 there is a separate loop for training expression then a separate loop for training speaker. If the voice is to have two components such as noise and expression, there will be a separate loop for noise and a separate loop for expression.

The framework of the above embodiment allows the models to be trained and adapted jointly, thus enhancing both the controllability and the quality of the generated speech. The above also allows for the requirements for the range of adaptation or training data to be more relaxed. For example, the adaptation data configuration shown in FIG. 14 could be used where there are:

3 female speakers—fs1; fs2; and fs3
3 male speakers—ms1, ms2 and ms3 where fs1 and fs2 have an American accent and are recorded speaking with neutral expression, fs3 has a Chinese accent and is recorded speaking for 3 lots of data, where one data set shows neutral expression, one data set shows happy expression and one data set angry expression. Male speaker ms1 has an American accent is recorded only speaking with neutral expression, male speaker ms2 has a Scottish accent and is recorded for 3 data sets speaking with the expressions of angry, happy and sad. The third male speaker ms3 has a Chinese accent and is recorded speaking with neutral expression. The above system allows voice data to be output with any of the 6 speaker voices with any of the recorded combinations of accent and expression.

In an embodiment, there is overlap between the voice attributes and speakers such that the grouping of the data used for the clusters is unique for each voice characteristic.

Figure 15:
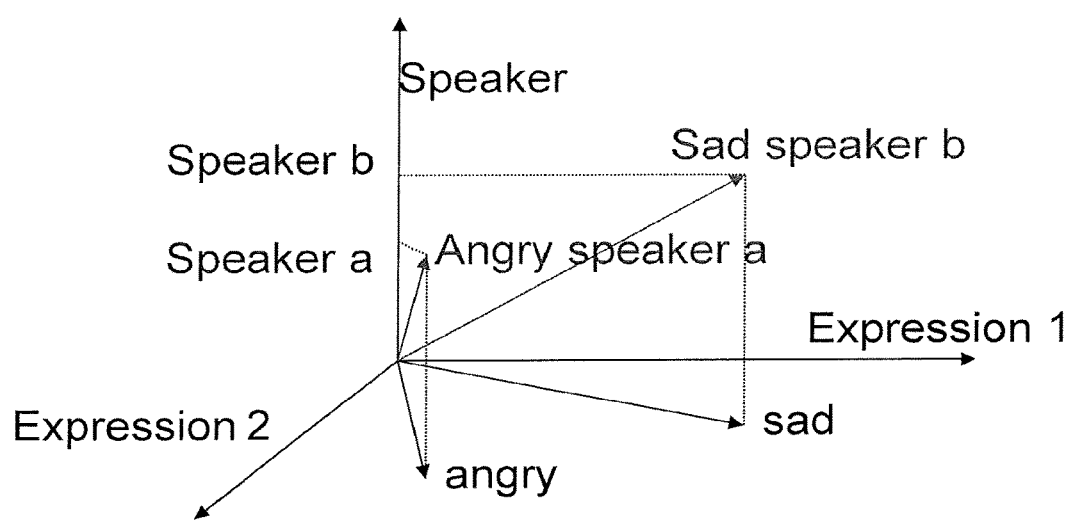
FIG. 15 is a plot showing how expression can be transplanted between different speakers.

FIG. 15 shows a plot useful for visualising how the speaker voices and expressions are related. The plot of FIG. 15 is shown in 3 dimensions but can be extended to higher dimension orders.

Speakers are plotted along the z axis. In this simplified plot, the speaker weightings are defined as a single dimension, in practice, there are likely to be 2 or more speaker weightings represented on a corresponding number of axis.

Expression is represented on the x-y plane. With expression 1 along the x axis and expression 2 along the y axis, the weighting corresponding to angry and sad are shown. Using this arrangement it is possible to generate the weightings required for an "Angry" speaker and a "Sad" speaker b. By deriving the point on the x-y plane which corresponds to a new expression or attribute, it can be seen how a new expression or attribute can be applied to the existing speakers.

Figure 16:
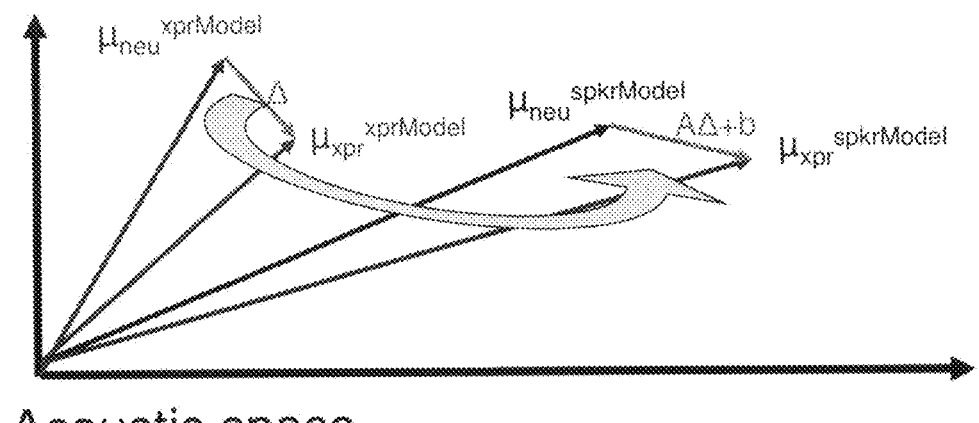
FIG. 16 is a plot of acoustic space showing the transplant of expressive speech.

FIG. 16 shows the principles explained above with reference to acoustic space. A 2-dimension acoustic space is shown here to allow a transform to be visualised. However, in practice, the acoustic space will extend in many dimensions.

In an expression CAT model the mean vector for a given expression is $$\mu_{xpr} = \sum_{\forall k} \lambda_k^{xpr} \mu_k.$$ Eqn. 36

Where $\mu_{xpr}$ is the mean vector representing a speaker speaking with expression $\lambda_k^{xpr}$ is the CAT weighting for component k for expression xpr and $\mu_k$ is the component k mean vector of component k.

The only part which is expression-dependent are the weights. Therefore, the difference between two different expressions (xpr1 and xpr2) is just a shift of the mean vectors:

$$\mu_{xpr2} = \mu_{xpr1} + \Delta_{xpr1,xpr2}$$ Eqn. 37

$$\Delta_{xpr1,xpr2} = \sum_{\forall k} (\lambda_k^{xpr2} - \lambda_k^{xpr1}) \mu_k.$$

This is shown in FIG. 16.

Thus, to port the characteristics of expression 2 (xpr2) to a different speaker voice (Spk2), it is sufficient to add the appropriate Δ to the mean vectors of the speaker model for Spk2. In this case, the appropriate Δ is derived from a speaker where data is available for this speaker speaking with xpr2. This speaker will be referred to as Spk1. Δ is derived from Spk1 as the difference between the mean vectors of Spk1 speaking with the desired expression xpr2 and the mean vectors of Spk1 speaking with an expression xpr. The expression xpr is an expression which is common to both speaker 1 and speaker 2. For example, xpr could be neutral expression if the data for neutral expression is available for both Spk1 and Spk2. However, it could be any expression which is matched or closely matched for both speakers. In an embodiment, to determine an expression which is closely matched for Spk1 and Spk2, a distance function can be constructed between Spk1 and Spk2 for the different expressions available for the speakers and the distance function may be minimised. The distance function may be selected from a euclidean distance, Bhattacharyya distance or Kullback-Leibler distance.

The appropriate Δ may then be added to the best matched mean vector for Spk2 as shown below:

$$\mu_{xpr2}^{Spk2} = \mu_{xpr1}^{Spk2} + \Delta_{xpr1,xpr2}$$ Eqn. 38

The above examples have mainly used a CAT based technique, but identifying a Δ can be applied, in principle, for any type of statistical model that allows different types of expression to be output.

Figure 17:
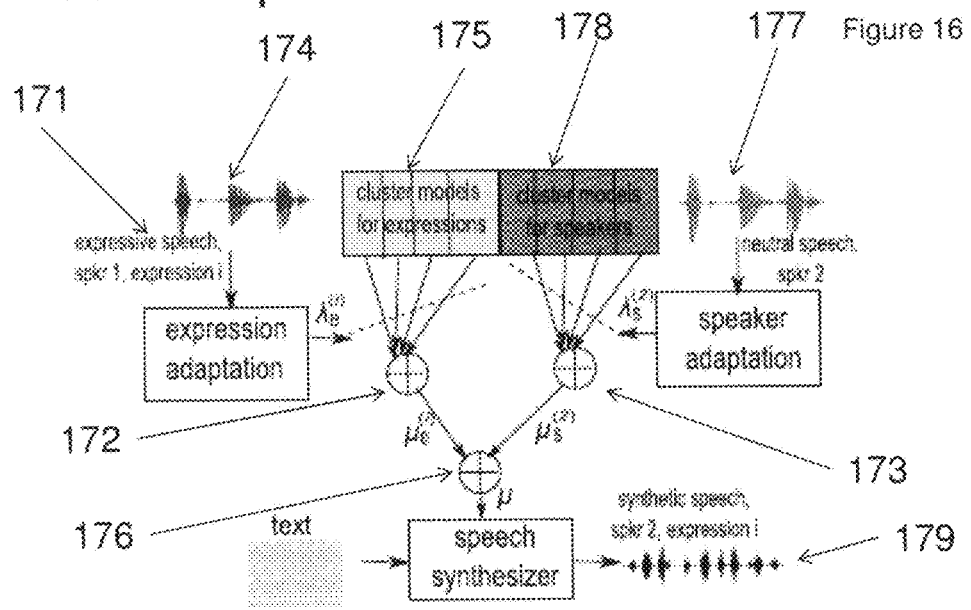
FIG. 17 is a schematic showing a method of expression transplantation using adaptation data.

FIG. 17 shows how the supervised adaptation is performed in the synthesis stage according to an embodiment. The expression information for synthetic speech is extracted from the expression adaptation data 174 which was naturally expressive speech. In this embodiment, the expression adaptation data is from one of the training speakers which labelled as "speaker 1" in FIG. 17, thus the speaker CAT weights are known. Given the speaker CAT weights 175, the expression adaptation data is projected to a point 172 in the expression space which is associated to an expression CAT weight vector 175 to maximize the likelihood of the expression adaptation data. Then, the generated expression CAT weights are shared over different speakers. As shown in FIG. 17, for a new speaker "speaker 2", for which only neutral speech 177 is provided, the speaker adaptation is performed to find a point 173 in the speaker space which maximizes the likelihood of the speaker adaptation data. Finally, the expression CAT weights 175 are concatenated 176 with speaker CAT weights 178 to generate the synthetic speech 179 for "speaker 2" with the same expression as the data from "speaker 1".

In another embodiment, SEF is used as part of training an expressive text to speech system which is viewed as a process to map a text data point to a point in a multi-dimension continuous space.

Figure 18:
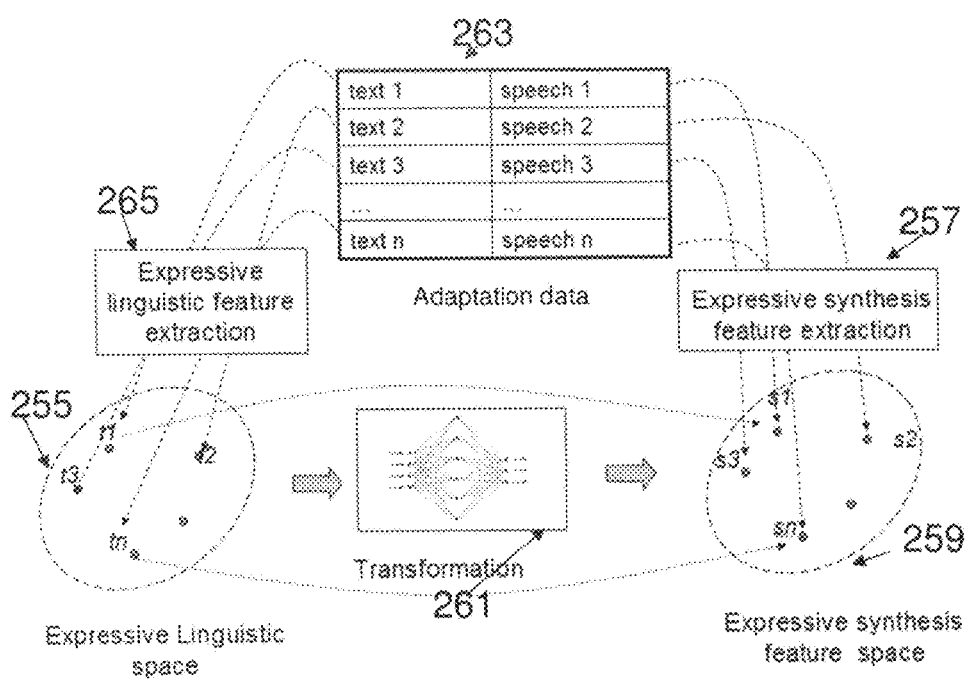
FIG. 18 is a schematic of a system for extracting an expressive synthesis vector; is a schematic of an expression deriving section in a system.

The training will be described with reference to FIG. 18. Training data 263 is provided with text and speech corresponding to the text input.

It is assumed that each utterance in the training data 263 contains unique expressive information. This unique expressive information can be determined from the speech data and can be read from the transcription of the speech, i.e. the text data as well. In the training data, the speech sentences and text sentences are synchronized as shown in FIG. 18.

An "expressive linguistic feature extraction" block 265 is provided which converts each text sentence in the training data into a vector which will be termed an expressive linguistic feature vector.

Any text sentences can be converted as a linguistic feature through expressive linguistic feature extraction block 265, and all the possible expressive linguistic features construct a first space 255 which will be called an expressive linguistic space. Each transcription of the training sentence can be viewed as a point in this expressive linguistic space. The expressive linguistic feature vector should catch the emotion information in text sentences.

During training, as well as extracting expressive linguistic features from the text, an "expressive synthesis feature extraction" block 257 is provided which converts each speech sentence into a vector which will be called an expressive synthesis feature vector.

Any speech sentences can be converted as an expressive synthesis feature through "expressive synthesis feature extraction" block 257, and all the possible expressive synthesis features construct an expressive synthesis space 259. The requirement to the expressive synthesis feature is that it should catch the unique expressive information of original speech sentence; meanwhile, this expressive information can be re-generated in the synthesis process.

Given the linguistic features from transcription of training data and the synthesis features from training speech sentences, methods and systems in accordance with this embodiment train a transformation 261 to transform a linguistic feature vector in linguistic feature space 255 to a synthesis feature vector in synthesis feature space 259.

In the synthesis stage, the "expressive linguistic feature extraction" block 265 converts the text to be synthesized into a linguistic feature vector in linguistic feature space 255, then through the transformation block 261, the linguistic feature is mapped to a synthesis feature in expressive synthesis space 259. This synthesis feature vector contains the emotion information in original text data and can be used by a synthesizer directly to synthesize the expressive speech.

In an embodiment, machine learning methods, e.g. neural network (NN) are used to provide the transformation block 261 and train the transformations from expressive linguistic space 255 to expressive synthesis space 259. For each sentence in the training data 263, the speech data is used to generate an expressive synthesis feature vector in synthesis feature space 259 and the transcription of the speech data is used to generate an expressive linguistic feature in linguistic feature space 255. Using the linguistic features of the training data as the input of NN and the synthesis features of the training data as the target output, the parameters of the NN can be updated to learn the mapping from linguistic feature space to synthesis feature space.

The "linguistic feature extraction" block 265 converts the text data into a linguistic feature vector. This feature vector should contain the discriminative information, i.e. if two text data contains different emotion, their linguistic features should be distinguishable in the linguistic features space.

In one embodiment, Bag-of-word (BoW) technologies are be used to generate the linguistic feature. BoW methods express the text data as vector of word frequencies. The dimension of the vector is equal to the size of vocabulary and each element contains the frequency of a particular word in vocabulary. Different well-developed BoW technologies can be applied, e.g. latent semantic analysis (LSA), probabilistic latent semantic analysis (pLSA), latent Dirichlet allocation (LDA) etc. Through these technologies, the original word frequency vector whose dimension is equal to vocabulary size can be compacted in very low dimension.

In a further embodiment, in order to model the emotion information in text data more accurately, different levels of knowledge from the text data are used to generate the linguistic features.

In one embodiment, not only the word level information, but also the lower level information such as full context phone sequence and the higher level information such as part-of-speech (POS), narration styles are to be used to generate the linguistic features.

Figure 19:
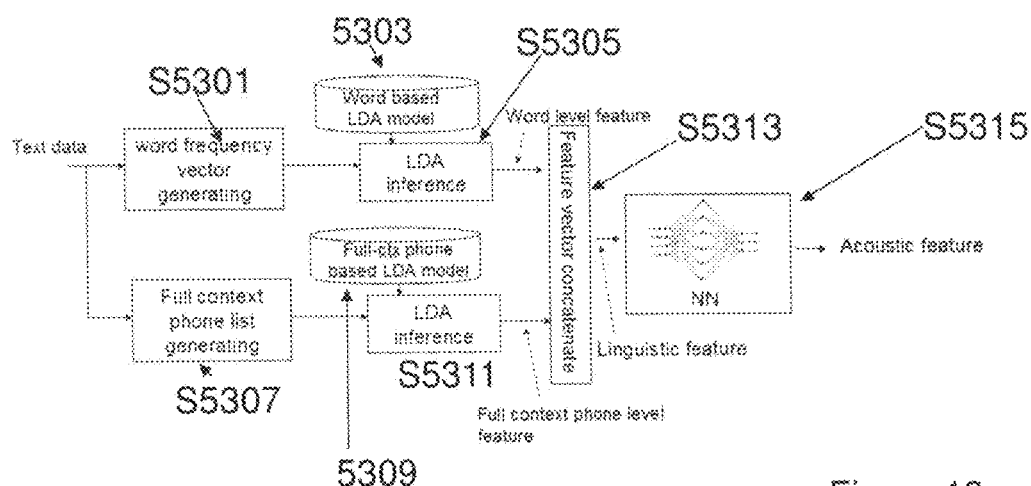
FIG. 19 is a schematic of a system for extracting expressive features using different levels of knowledge information.

To combine the information from the different levels together, in one embodiment, a parallel structure is used as shown in FIG. 19. In the parallel structure, the features in different levels are extracted separately, and then the features in different levels are concatenated to one big vector to be the input for the transformation block.

FIG. 19 illustrates a parallel structure for extracting linguistic features which may be used in a system in accordance with an embodiment. Text data are converted into a word frequency vector in step S5301. Next, an LDA model 5303 with words as units is used at step S5305 to convert the word frequency vector into a word level feature vector. In step S5305, variantial posterior dirichlet parameters are estimated through an inference process.

At the same time, text data is converted as a sequence of full context phones in step S5307. This full context phone sequence is converted into a full context phone level feature vector in S5311 using a LDA model 309 with full context phones as units.

Then the word level feature vector and the full context phone level feature vector are concatenated as linguistic features to form the linguistic feature vector in S5313.

FIG. 19 is used to show an example of how to extract linguistic features. In further embodiments, higher level knowledge such as POS, narration style and any other useful information from text data can be integrated into linguistic feature.

Further, BoW methods other than LDA can be used to extract linguistic feature as well.

Linguistic features determined from different levels of information can also be combined using a hierarchical structure as well. In one embodiment of such a hierarchical structure, linguistic features with different levels of knowledge are incorporated into the system with a cascade of NNs, as shown in FIG. 20.

Figure 20:
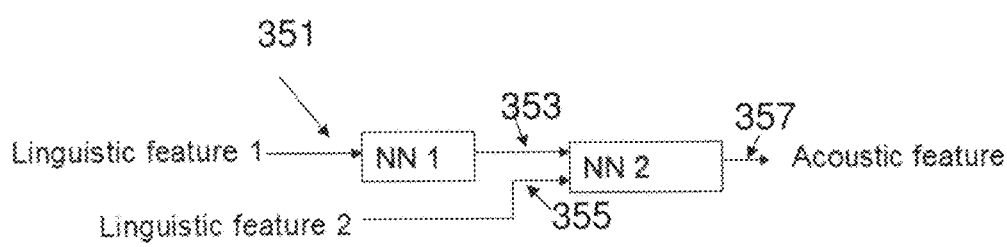
FIG. 20 is a schematic of a system for extracting expressive features using cascading neural networks to model different levels of knowledge.

In FIG. 20, the linguistic feature 1 and linguistic feature 2 represent linguistic features determined from different levels of knowledge, e.g. word level feature, full context phone level feature etc.

Feature 1 is used as input 351 of NN1. Then, the output 353 of NN1 is combined with feature 2 as input 355 of NN2 to generate the acoustic feature at output 357.

Returning to FIG. 18, the expressive synthesis feature extraction block 257 is used to represent the expressive information of the speech data. Each point in the speaker dependent acoustic space 259 represents unique expressive information in speech.

In an embodiment, the above described text to speech system uses "expression weights" to introduce expression into the speech. The expression deriving section described above with reference to FIGS. 18 to 20 can output these expression dependent weights directly.

This allows expressiveness dependent HMM parameters to be represented as the linear interpolation of cluster models and the interpolation weights for each cluster HMM model are used to represent the expressiveness information.

Therefore, the training data can be classified into groups and the group dependent CAT weights can be estimated using all the training sentences in this group. If N training sentences are classified into M groups (M<<N), the training data can be expressed as M points in the CAT weight space.

In an embodiment, the NN used as transformation to map the linguistic features into the synthesis features and the CAT model which is used to construct the speaker dependent acoustic space, can be trained jointly. The joint training process can be described as follows 1. Initial CAT model training using speaker and expression factorization to generate initial canonical model M0 and the initial CAT weight set $\Lambda_0$ which is composed of the CAT weights for all the training sentences, set iteration number i=0.
2. Given the expressive linguistic features of training sentences and the CAT weight set of training sentences $\Lambda_i$, the NN for iteration i, i.e. $NN_i$ is trained using least square error criterion. This is done for speakers individually such that a speaker dependent map from linguistic space to acoustic space is trained for each speaker.
3. Using the expressive linguistic features of training sentences as input, $NN_i$ generate output CAT weight set of training sentences $O_i$. This is done for each utterance from each speaker.
4. $\Lambda_{i+1}=O_i$. Given $\Lambda_{i+1}$ re-train the CAT canonical model $M_{i+1}$, to maximize the likelihood of training data.
5. i=i+1 if algorithm converged, go to 6, else go to 2.
6. end.

Through the process mentioned above, the NN and the CAT model are updated jointly which can improve performance at the synthesis stage.

The above training method, in which mapping is trained for each speaker individually, allows for the fact that different speakers may express the same emotion in different ways. However, because of the speaker and expression factorization used to generate the initial canonical model, the expression synthesis vector obtained by mapping trained by the speech data from one speaker may be transplanted to another speaker using as described in relation to FIGS. 14 to 17 above.

In another embodiment, a speaker independent linguistic space to acoustic space mapping is trained in step 2 above. This comprises merging all the training samples for different speakers to train a NN common to all the speakers.

This joint training process is not limited to NN and CAT models. In general a transformation from linguistic feature space to synthesis feature space other than NN and the methods to construct the synthesis feature space other than CAT can be updated using joint training in the same framework. For example, the joint training process could be used with CMLLR.

The speaker and expression factorization employed in step 1 above may comprise unsupervised or supervised speaker and expression factorization. Unsupervised speaker and expression factorization described above according to an embodiment requires no labeling of the training data and further ensures that expression clustering results are unaffected by speaker factors when dealing with multi-speaker data. Thus the expression clusters generated by unsupervised SEF are completely independent of speaker and enable effective transplanting of expression from the acoustic space of one speaker to the acoustic space of another. This process will be described in detail below.

The above has described the training for the system. The text to speech synthesis will now be described with reference to FIG. 21.

Figure 21:
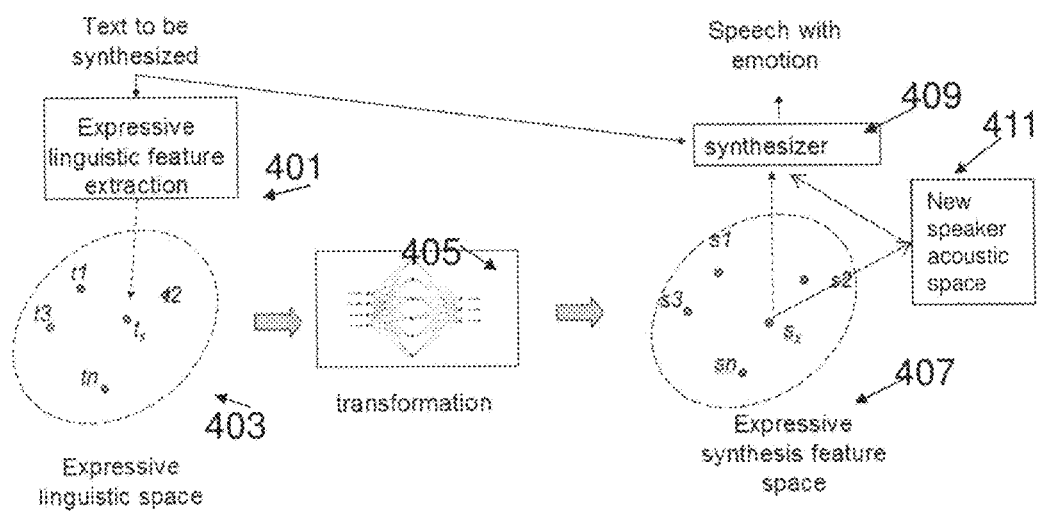
FIG. 21 is a schematic of an expression deriving section in a system.

The synthesis system shown in FIG. 21 comprises an expressive linguistic feature extraction block 401 which extracts an expressive feature vector from the response generated by the dialogue section in an expressive linguistic space 403 as described with reference to the training. The process for extracting this vector in the synthesis stage is identical to the process described in the training stage.

The expressive feature vector is then mapped via transformation block 405 to an expressive synthesis vector in an expressive synthesis space 407. This expression synthesis space forms part of the acoustic space of the speaker for which the expression mapping was trained. The transformation block 405 has been trained as described above.

The determined expressive synthesis vector is then used in the synthesis of the output speech as synthesizer 409. In an embodiment, it is first transplanted to the acoustic space of another speaker 411. This embodiment will be described below. As described above, in one embodiment the transformation block 405 maps the expressive linguistic feature vector directly to CAT weights in the speaker dependent acoustic space 407.

Note that when employing SEF to train the model, the speaker dependent acoustic space is divided into speaker space and expression space. The speaker dependent acoustic space described above is the acoustic space of the speaker for which the expression mapping was trained. However, as the model was trained using speaker and expression factorization (SEF), the expressive synthesis vector which is determined in this manner is independent of speaker. Therefore, in an embodiment, it may be transplanted to the acoustic space of second speaker such that the voice of the second speaker may be synthesized with the expression predicted from the text. Thus the expression may be transplanted from one speaker to another. The process of transplantation was described in relation to FIGS. 14-17 above.

Both the linguistic space and the expressive synthesis space constructed by training using SEF are speaker independent. However, the speaker space and the non-linear transforms that build the map between linguistic space and the expressive synthesis space are not speaker-independent. Thus, in the synthesis stage, using the speaker independent linguistic features, and the non-linear transform trained using the speaker data of a first speaker, we obtain a point in the expressive synthesis space of the first speaker using expression prediction. Then, since the expression space is speaker independent in a model trained using SEF, this expression can be transplanted to a second speaker. Hence, the second speaker can read the text in the same style as the first speaker.

In a method in accordance with an embodiment, there is no need to prepare special training data or require human interaction to assess training data. Further, the text to be synthesized is converted into the linguistic feature vector directly. This linguistic feature vector contains much more emotion information than a single emotion ID. The transformation block converts a linguistic feature vector into an expressive synthesis feature with same emotion. Further, this synthesis feature can be used to synthesize the speech with same emotion as in original text data.

If in expressive synthesis feature space, each training sentence is related to a unique synthesis feature vector, the unique emotion information in each sentence is learned by the transformation, e.g. NN. It can provide the user with very rich emotion resources for synthesis.

In a method in accordance with an embodiment, there is no need to prepare special training data or require human interaction to assess training data. Further, the text to be synthesized is converted into the linguistic feature vector directly. This linguistic feature vector contains much more emotion information than a single emotion ID. The transformation block converts a linguistic feature vector into an expressive synthesis feature with same emotion. Further, this synthesis feature can be used to synthesize the speech with same emotion as in original text data with a plurality of speakers.

If in expressive synthesis feature space, each training sentence is related to a unique synthesis feature vector, the unique emotion information in each sentence is learned by the transformation, e.g. NN. It can provide the user with very rich emotion resources for synthesis.

The training sentences when in the synthesis feature space can be classified into groups and all the training sentences in one group share the emotion information. Through this way, the training of transformation is improved since the number of patterns which need to be learnt is reduced. Therefore the transformation being estimated can be more robust. Choosing a sentence based synthesis feature or group based synthesis feature, tuning the number of groups for training data, may achieve a balance between the expressiveness and robustness for synthesis performance more easily in methods in accordance with embodiments of the invention.

In the above method, hard decision emotion recognition can be avoided and this will reduce errors. The possible outputs of a NN are infinite. It means that the proposed method potentially can generate infinite different synthesis features which are related to different emotions for synthesis. Further, the above method can achieve the balance between expressiveness and robustness easily.

In the above synthesis process, the emotion information of the text data does not need to be known or explicitly recognized by a human or from other sources. The training is completely automatic.

In the above embodiment, a multi-dimensional continuous expressive speech synthesis space is defined such that every point in the space defines parameters for an expressive speech synthesis system. Also, a mapping process is trained which can map text features to a point in expressive space which then defines parameters for an expressive speech synthesis process.

To illustrate the method of unsupervised speaker and expression factorisation (SEF) using the CAT factorization method, two systems were trained using this method using 28 hours of training data from four audiobooks with expression information unlabelled. One system was trained according to a conventional model with automatic expression clustering based on acoustic features followed separately by supervised SEF. The other system was trained using the unsupervised SEF method according to an embodiment embodiment, wherein the expression clustering and SEF are combined into a single process. An ABX test was performed comparing speech produced by both systems. ABX tests are well known in the art. Listeners were required to choose which of the synthetic voices sounded most like a reference human voice. The test was performed using both speakers using for training the model and test speakers. The ABX test results for training speakers are shown in Table 1 and the ABX test results for test speakers are shown in Table 2.

TABLE 1

| ABX test for training speakers | | | |
|---|---|---|---|
| speaker | Conventional method | Proposed method | P |
| 1 | 45.0% | 55.0% | 0.007 |
| 2 | 48.4% | 51.6% | 0.241 |
| 3 | 43.3% | 56.7% | <0.001 |
| 4 | 47.9% | 52.1% | 0.168 |
| overall | 45.7% | 54.3% | <0.001 |

TABLE 2

| ABX test for test speakers | | | |
|---|---|---|---|
| speaker | Conventional method | Proposed method | P |
| 1 | 45.9% | 54.1% | 0.029 |
| 2 | 45.2% | 54.8% | 0.014 |
| Overall | 46.0% | 54.0% | 0.02 |

Where the percentages indicate the percentage of listeners who chose the voice and P indicates p-value. p-values are well known in the art and will not be described here. A p-value of less than 0.025 indicates significant difference.

The experimental results indicate that the proposed method outperforms the conventional method of supervised SEF significantly.

Methods and systems in accordance with the above embodiments may be used as part of expressive speech synthesis, text to speech synthesis, ebook reading, speech to speech translation or any other situation where speech may be employed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

APPENDIX

Figure 22:
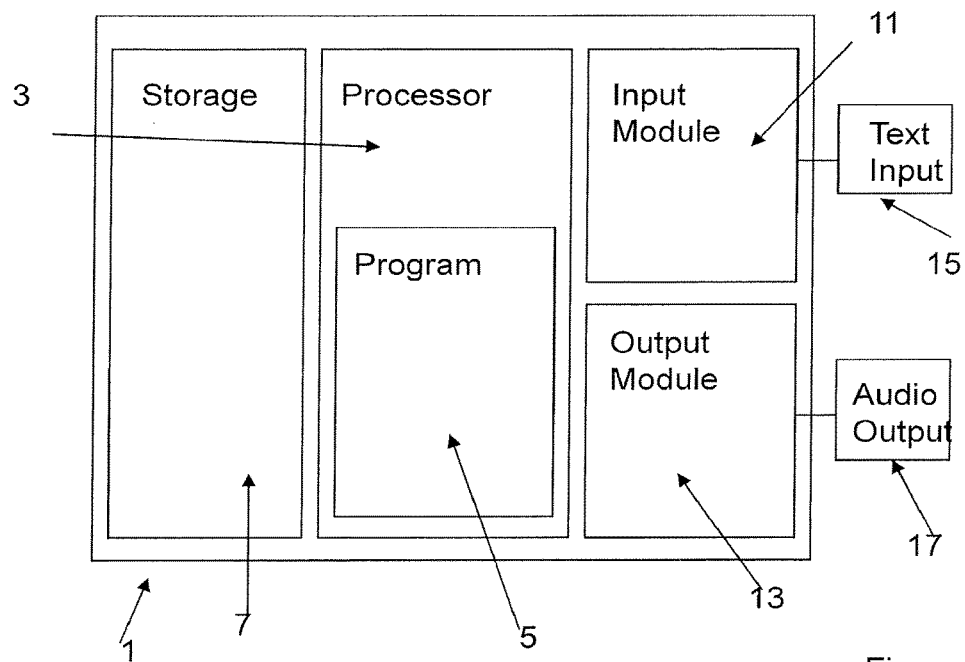
FIG. 22 is schematic of a text to speech system.

FIG. 22 shows a text to speech system 1. The text to speech system 1 comprises a processor 3 which executes a program 5. Text to speech system 1 further comprises storage 7. The storage 7 stores data which is used by program 5 to convert text to speech. The text to speech system 1 further comprises an input module 11 and an output module 13. The input module 11 is connected to a text input 15. Text input 15 receives text. The text input 15 may be for example a keyboard. Alternatively, text input 15 may be a means for receiving text data from an external storage medium or a network. In an embodiment, the system further comprises an expression deriving section. The role of this section is described in relation to FIGS. 18-21.

Connected to the output module 13 is output for audio 17. The audio output 17 is used for outputting a speech signal converted from text which is input into text input 15. The audio output 17 may be for example a direct audio output e.g. a speaker or an output for an audio data file which may be sent to a storage medium, networked etc.

In use, the text to speech system 1 receives text through text input 15. The program 5 executed on processor 3 converts the text into speech data using data stored in the storage 7. The speech is output via the output module 13 to audio output 17.

Figure 23:
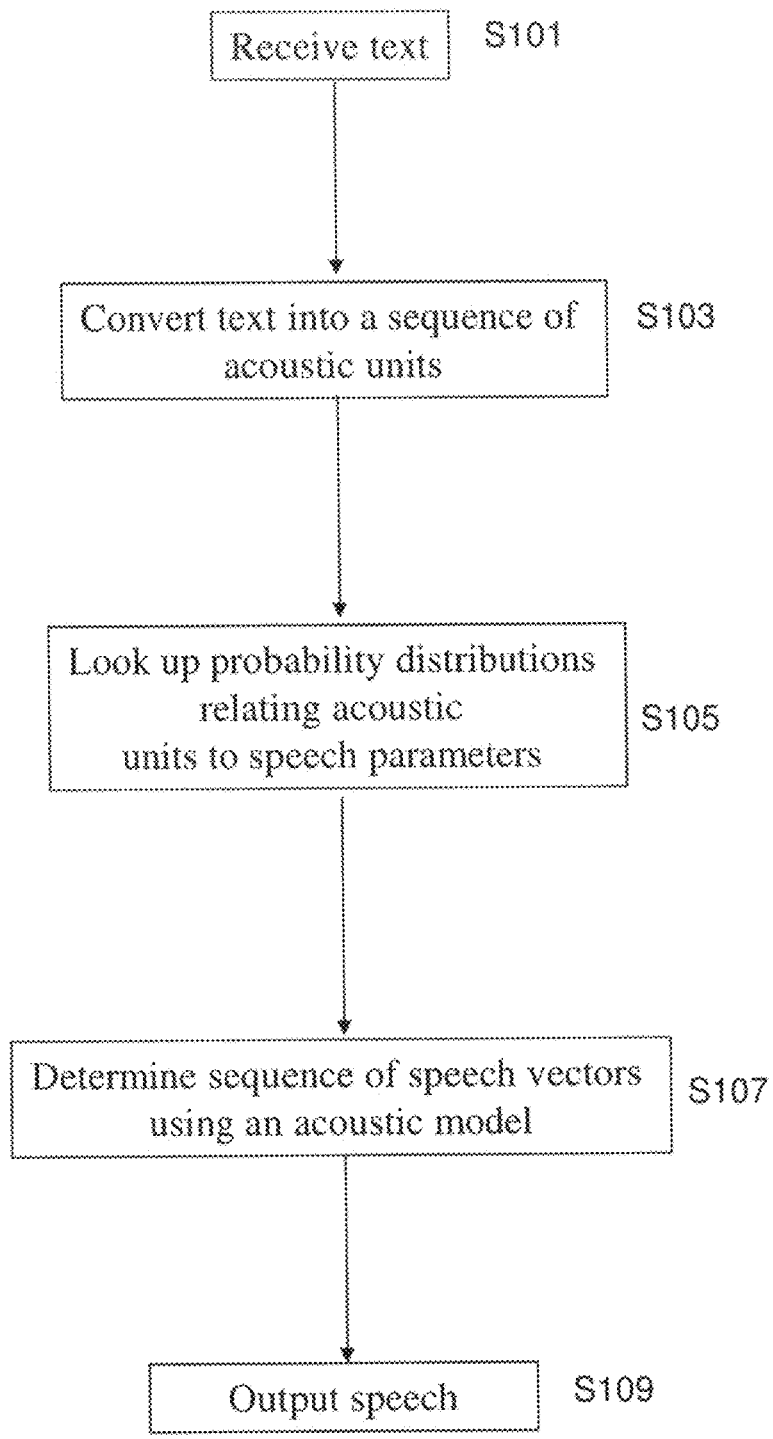
FIG. 23 is a flow diagram showing the steps performed by a speech processing system.

A simplified process will now be described with reference to FIG. 23. In first step, S101, text is inputted. The text may be inputted via a keyboard, touch screen, text predictor or the like. The text is then converted into a sequence of acoustic units. These acoustic units may be phonemes or graphemes. The units may be context dependent e.g. triphones which take into account not only the phoneme which has been selected but the proceeding and following phonemes. The text is converted into the sequence of acoustic units using techniques which are well-known in the art and will not be explained further here.

In step S105, the probability distributions are looked up which relate acoustic units to speech parameters. In this embodiment, the probability distributions will be Gaussian distributions which are defined by means and variances. Although it is possible to use other distributions such as the Poisson, Student-t, Laplacian or Gamma distributions some of which are defined by variables other than the mean and variance.

It is impossible for each acoustic unit to have a definitive one-to-one correspondence to a speech vector or "observation" to use the terminology of the art. Many acoustic units are pronounced in a similar manner, are affected by surrounding acoustic units, their location in a word or sentence, or are pronounced differently by different speakers. Thus, each acoustic unit only has a probability of being related to a speech vector and text-to-speech systems calculate many probabilities and choose the most likely sequence of observations given a sequence of acoustic units.

Figure 24:
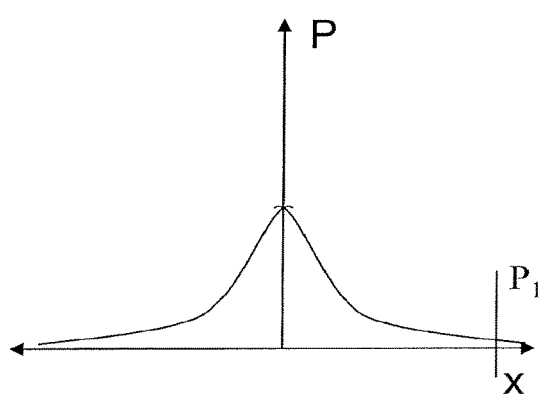
FIG. 24 is a schematic of a Gaussian probability function.

A Gaussian distribution is shown in FIG. 24. FIG. 24 can be thought of as being the probability distribution of an acoustic unit relating to a speech vector. For example, the speech vector shown as X has a probability P1 of corresponding to the phoneme or other acoustic unit which has the distribution shown in FIG. 24.

The shape and position of the Gaussian is defined by its mean and variance. These parameters are determined during the training of the system.

These parameters are then used in the acoustic model in step S107. In this description, the acoustic model is a Hidden Markov Model (HMM). However, other models could also be used.

The text of the speech system will store many probability density functions relating an to acoustic unit i.e. phoneme, grapheme, word or part thereof to speech parameters. As the Gaussian distribution is generally used, these are generally referred to as Gaussians or components.

In a Hidden Markov Model or other type of acoustic model, the probability of all potential speech vectors relating to a specific acoustic unit must be considered. Then the sequence of speech vectors which most likely corresponds to the sequence of acoustic units will be taken into account. This implies a global optimization over all the acoustic units of the sequence taking into account the way in which two units affect to each other. As a result, it is possible that the most likely speech vector for a specific acoustic unit is not the best speech vector when a sequence of acoustic units is considered.

In some embodiments, there will be a plurality of different states which will be each be modelled using a Gaussian. For example, in an embodiment, the text-to-speech system comprises multiple streams. Such streams may be selected from one or more of spectral parameters (Spectrum), Log of fundamental frequency (Log $F_0$), first differential of Log $F_0$ (Delta Log $F_0$), second differential of Log $F_0$ (Delta-Delta Log $F_0$), Band aperiodicity parameters (BAP), duration etc. The streams may also be further divided into classes such as silence (sil), short pause (pau) and speech (spe) etc. In an embodiment, the data from each of the streams and classes will be modelled using a HMM. The HMM may comprise different numbers of states, for example, in an embodiment, 5 state HMMs may be used to model the data from some of the above streams and classes. A Gaussian component is determined for each HMM state.

Once a sequence of speech vectors has been determined, speech is output in step S109.

Figure 25:
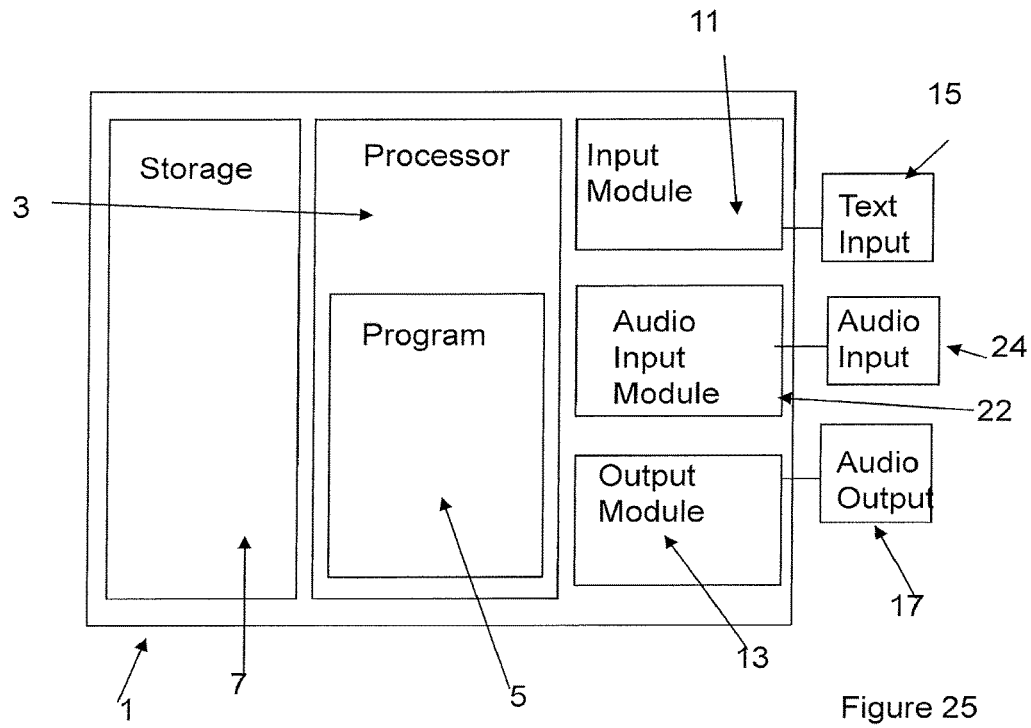
FIG. 25 is schematic of a text to speech system which can be trained.

FIG. 25 shows a system for training an acoustic model for use in a text-to-speech system. The system of FIG. 25 is similar to that described with reference to FIG. 22. Therefore, to avoid any unnecessary repetition, like reference numerals will be used to denote like features.

In addition to the features described with reference to FIG. 22, FIG. 25 also comprises an audio input 24 and an audio input module 22. When training a system, it is necessary to have an audio input which matches the text being inputted via text input 15.

In speech processing systems which are based on Hidden Markov Models (HMMs), the HMM is often expressed as:

$$M=(A,B,\Pi) \qquad \text{Eqn. 39,}$$

where $A=\{a_{ij}\}_{i,j=1}^{N}$ and is the state transition probability distribution, $B=\{b_j(o)\}_{j=1}^{N}$ is the state output probability distribution and $\Pi=\{\pi_i\}_{i=1}^{N}$ is the initial state probability distribution and where N is the number of states in the HMM.

How a HMM is used in a text-to-speech system is well known in the art and will not be described here.

In the embodiments described below, the state transition probability distribution A and the initial state probability distribution are determined in accordance with procedures well known in the art. Therefore, the remainder of this description will be concerned with the state output probability distribution.

The aim when training a conventional text-to-speech system is to estimate the model parameter set which maximises likelihood for a given observation sequence. Generally in text to speech systems the state output vector or speech vector o(t) from an $m^{th}$ Gaussian component in a model set M is:

$$p(o_t|m,M)=N(o_t;\mu_m,\Sigma_m) \qquad \text{Eqn. 40,}$$

where $\mu_m$ and $\Sigma_m$ are the mean and covariance of the $m^{th}$ Gaussian component.

As it is not possible to obtain the above model set based on so called Maximum Likelihood (ML) criteria purely analytically, the problem is conventionally addressed by using an iterative approach known as the expectation maximisation (EM) algorithm which is often referred to as the Baum-Welch algorithm. Here, an auxiliary function (the "Q" function) is derived:

$$Q(M, M') = \sum_{m,t} \gamma_m(t)\log p(o(t), m \mid M), \qquad \text{Eqn. 42}$$

where $\gamma_m(t)$ is the posterior probability of component m generating the observation o(t) given the current model parameters M' and M is the new parameter set. After each iteration, the parameter set M' is replaced by the new parameter set M which maximises Q(M, M'). p(o(t), m|M) is a generative model such as a GMM, HMM etc.

The model may incorporate factors of speech data such as speaker, expression, or noise environment, or some other factor of speech data. The model then has a state output vector of:

$$p(o_t|m,s,M)=N(o_t;\hat{\mu}_m^{(s)},\hat{\Sigma}_m^{(s)}) \qquad \text{Eqn. 43,}$$

where m∈{1, . . . , MN}, l∈{1, . . . , T}, and s∈{1, . . . , S } are indices for component, time and speaker, or expression, or noise environment, or some other factor of speech data respectively respectively and where MN, T and S are the total number of components, frames and speakers (or expression, or noise environment, or some other factor of speech data) respectively. In the discussion below, it is assumed the speech factor is speaker.

The exact form of $\hat{\mu}_m^{(s)}$ and $\hat{\Sigma}_m^{(s)}$ will depend on any speaker dependent transforms that are applied. Two approaches to such speaker dependent approaches are discussed below. However, others are also possible.

Cluster Adaptive Training (CAT) is a powerful approach for training on, and synthesising diverse data. CAT was originally developed for speech recognition. It has been modified in order to support the increased importance of context in statistical speech synthesis.

In conventional CAT methods different speakers are accommodated by applying weights to model parameters which have been arranged into clusters. A separate decision tree is used for each cluster. This yields an intersect form of a model for the context realisation, allowing a very fine representation of context, without dramatically increasing the number of model parameters.

In an embodiment, the decisions used in said trees are based on linguistic, phonetic and prosodic variations. In an embodiment, there is a decision tree for each component which is a member of a cluster. Prosodic, phonetic, and linguistic contexts affect the final speech waveform. Phonetic contexts typically affects vocal tract, and prosodic (e.g. syllable) and linguistic (e.g., part of speech of words) contexts affects prosody such as duration (rhythm) and fundamental frequency (tone). Each cluster may comprise one or more sub-clusters where each sub-cluster comprises at least one of the said decision trees.

The above can either be considered to retrieve a weight for each sub-cluster or a weight vector for each cluster, the components of the weight vector being the weightings for each sub-cluster.

The following configuration shows a standard embodiment. To model this data, in this embodiment, 5 state HMMs are used. The data is separated into three classes for this example: silence, short pause, and speech. In this particular embodiment, the allocation of decision trees and weights per sub-cluster are as follows.

In this particular embodiment the following streams are used per cluster:
Spectrum: 1 stream, 5 states, 1 tree per state×3 classes
Log F0: 3 streams, 5 states per stream, 1 tree per state and stream×3 classes
BAP: 1 stream, 5 states, 1 tree per state×3 classes
Duration: 1 stream, 5 states, 1 tree×3 classes (each tree is shared across all states)
Total: 3×26=78 decision trees For the above, the following weights are applied to each stream per voice characteristic e.g. speaker:
Spectrum: 1 stream, 5 states, 1 weight per stream×3 classes
Log F0: 3 streams, 5 states per stream, 1 weight per stream×3 classes
BAP: 1 stream, 5 states, 1 weight per stream×3 classes
Duration: 1 stream, 5 states, 1 weight per state and stream×3 classes
Total: 3×10=30 weights As shown in this example, it is possible to allocate the same weight to different decision trees (spectrum) or more than one weight to the same decision tree (duration) or any other combination. As used herein, decision trees to which the same weighting is to be applied are considered to form a sub-cluster.

Each cluster model contains a set of Gaussian mean parameters which the Gaussian variances are shared over all clusters.

Thus for the CAT model, $$\hat{\mu}_m^{(s)} = \sum_i \lambda_i^{(s)} \mu_{c(m,i)}, \quad \text{Eqn. 44}$$

$$\hat{\Sigma}_m^{(s)} = \Sigma_{v(m)}, \quad \text{Eqn. 45}$$

where $\mu_{c(m,i)}$ are the means of cluster I for component m and $v(m) \in \{1, \ldots, V\}$ denotes the leaf node in a covariance decision tree to which the co-variance matrix of the component m belongs and V is the total number of variance decision tree leaf nodes.

Eqn 43 can be rewritten as $$p(o_t|\lambda^{(s)}, M^{(m)}, \Sigma_{v(m)}) = N(o_t; M^{(m)}\lambda^{(s)}, \Sigma_{v(m)}) \quad \text{Eqn. 46,}$$

where $$M^{(m)} = [\mu_{(m,1)} \cdots \mu_{(m,P)}] \quad \text{Eqn. 47,}$$

is the matrix of P cluster mean vectors for component m. Thus, in a CAT model, the mean vector to be used is a linear interpolation of all the cluster means.

It is simple to extend this form of representation to include multiple regression classes with each of the expressive states. Regression classes are well known in the art and will not be discussed here.

In common with standard CAT approaches, the first cluster is specified as the bias cluster, thus $$\lambda^{(s)} = [1 \lambda_2^{(s)} \ldots \lambda_P^{(s)}]^T \quad \text{Eqn. 48.}$$

The training of the CAT model can be divided into three parts: cluster model training, CAT weight estimation and decision tree construction.

The auxiliary function for this model can be expressed as:

$$Q(M, M') = \quad \text{Eqn. 49}$$
$$-\frac{1}{2} \sum_{m,t,s} \gamma_m(t) \left\{ \log \left| \hat{\Sigma}_{v(m)} \right| + (o(t) - \hat{\mu}_m^{(s)})^T \hat{\Sigma}_{v(m)}^{-1} (o(t) - \hat{\mu}_m^{(s)}) \right\} + C,$$

where C is a constant independent of M.

Thus, using the above and substituting equations 5 and 6 in equation 10, the auxiliary function shows that the model parameters may be split into three distinct parts.

The first part are the parameters of the canonical model i.e. speaker independent means $\{\mu_n\}$ and the speaker independent covariance $\{\Sigma_k\}$, where the indices n and k indicate leaf nodes of the mean and variance decision trees which will be described later. The second part is the speaker dependent weights $\lambda_i^{(s)}$ where s indicates speaker and i the cluster index parameter. The third part are the means of the speaker dependent cluster $\mu_{c(m,x)}$.

Once the auxiliary function is expressed in the above manner, it is then maximized with respect to each of the variables in turn in order to obtain the ML values of the speaker and voice characteristic parameters, the speaker dependent parameters and the voice characteristic dependent parameters.

In order to perform the first part of the CAT training, estimating the cluster model parameters, the auxiliary function of equation 49 is differentiated with respect to Gaussian mean vector $\mu_n$ as follows:

$$\frac{\partial Q(M; \hat{M})}{\partial \mu_n} = k_n - G_{nn}\mu_n - \sum_{v \neq n} G_{nv}\mu_v \quad \text{Eqn 50}$$

Where $$G_{nv} = \sum_{\substack{m,i,j \\ c(m,i)=n \\ c(m,j)=v}} G_{ij}^{(m)}, \quad k_n = \sum_{\substack{m,i \\ c(m,i)=n}} k_i^{(m)}, \quad \text{Eqn. 51}$$

with $G_{ij}^{(m)}$ and $k_i^{(m)}$ accumulated statistics:

$$G_{ij}^{(m)} = \sum_{t,s} \gamma_m(t,s) \lambda_{i,q(m)}^{(s)} \Sigma_{v(m)}^{-1} \lambda_{j,q(m)}^{(s)} \quad \text{Eqn. 52}$$

$$k_i^{(m)} = \sum_{t,s} \gamma_m(t,s) \lambda_{i,q(m)}^{(s)} \Sigma_{v(m)}^{-1} o(t).$$

By maximizing the equation in the normal way by setting the derivative to zero, the following formula is achieved for the ML estimate of $\mu_n$ i.e. $\hat{\mu}_n$:

$$\hat{\mu}_n = G_{nn}^{-1}\left(k_n - \sum_{v \neq n} G_{nv}\mu_v\right). \quad \text{Eqn. 53}$$

It should be noted, that the ML estimate of $\mu_n$ also depends on $\mu_k$ where k does not equal n. The index n is used to represent leaf nodes of decisions trees of mean vectors, whereas the index k represents leaf modes of covariance decision trees. Therefore, it is necessary to perform the optimization by iterating over all $\mu_n$ until convergence.

This can be performed by optimizing all $\mu_n$ simultaneously by solving the following equations.

$$\begin{bmatrix} G_{11} & \cdots & G_{1N} \\ \vdots & \ddots & \vdots \\ G_{N1} & \cdots & G_{NN} \end{bmatrix} \begin{bmatrix} \hat{\mu}_1 \\ \vdots \\ \hat{\mu}_N \end{bmatrix} = \begin{bmatrix} k_1 \\ \vdots \\ k_N \end{bmatrix}. \quad \text{Eqn. 54}$$

However, if the training data is small or N is quite large, the coefficient matrix of equation 15 cannot have full rank. This problem can be avoided by using singular value decomposition or other well-known matrix factorization techniques.

The same process is then performed in order to perform an ML estimate of the covariances i.e. the auxiliary function shown in equation 49 is differentiated with respect to $\Sigma_k$ to give:

$$\hat{\Sigma}_k = \frac{\sum_{\substack{t,s,m \\ v(m)=k}} \gamma_m(t,s)\overline{o}(t)\overline{o}(t)^\top}{\sum_{\substack{t,s,m \\ v(m)=k}} \gamma_m(t,s)}, \quad \text{Eqn. 55}$$

Where $$\overline{o}(t) = o(t) - \mu_m^{(s)}. \quad \text{Eqn. 56}$$

The ML estimate for speaker dependent weights and the speaker dependent linear transform can also be obtained in the same manner i.e. differentiating the auxiliary function with respect to the parameter for which the ML estimate is required and then setting the value of the differential to 0.

The second part of the training comprises estimating the CAT weight vectors. The auxiliary function is differentiated with respect to $\lambda^{(s)}$ and equated to zero, to yield:

$$\lambda^{(s)} = \quad \text{Eqn. 57}$$

$$\left(\sum_{t,m} \gamma_m(t,s) M_m^T \sum_{v(m)}^{-1} M_m\right)^{-1} \sum_{t,m} \gamma_m(t,s) M_m^T \sum_{v(m)}^{-1} (o(t) - \mu_{c(m,1)}).$$

where $\mu_{c(m,I)}$ the mean vector of the bias cluster for component m.

The process is performed in an iterative manner.

The third part of the CAT training model is decision tree construction. The cluster dependent decision trees are constructed cluster by cluster. When the decision tree of a cluster is constructed, including the tree structures, Gaussian mean vectors and covariance matrices are fixed.

Each binary decision tree is constructed in a locally optimal fashion starting with a single root note representing all contexts. In this embodiment, by context, the following bases are used, phonetic, linguistic and prosodic. As each node is created, the next optimal question about the context is selected. The question is selected on the basis of which question causes the maximum increase in likelihood and the terminal nodes generated in the training examples.

Then, the set of terminal nodes is searched to find the one which can be split using its optimum question to provide the largest increase in the total likelihood to the training data. Providing that this increase exceeds a threshold, the node is divided using the optimal question and two new terminal nodes are created. The process stops when no new terminal nodes can be formed since any further splitting will not exceed the threshold applied to the likelihood split.

Figure 26:
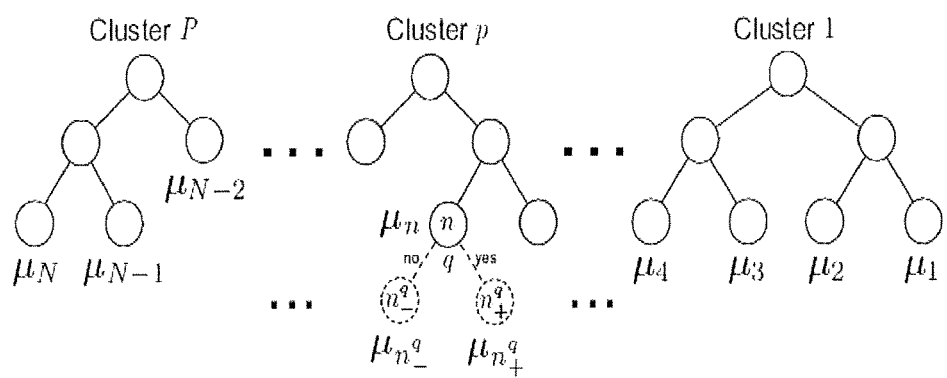
FIG. 26 is a schematic of decision trees used by certain embodiments.

This process is shown for example in FIG. 26. The nth terminal node in a mean decision tree is divided into two new terminal nodes $n_+^q$ and $n_-^q$ by a question q. The likelihood gain achieved by this split can be calculated as follows:

$$\mathcal{L}(n) = -\frac{1}{2}\mu_n^\top \left(\sum_{m \in S(n)} G_{ii}^{(m)}\right)\mu_n + \mu_n^\top \sum_{m \in S(n)}\left(k_i^{(m)} - \sum_{j \neq i} G_{ij}^{(m)}\mu_{c(m,j)}\right), \quad \text{Eqn. 58}$$

where S(n) denotes a set of components associated with node n. Note that the terms which are constant with respect to $\mu_n$ are not included.

The construction of decision trees is based on the assumption that when the tree of one cluster is constructed, the parameters of other clusters are fixed. The maximum likelihood of $\mu_n$ is given by equation 53. Thus, the likelihood of node n can be re-written as:

$$\mathcal{L}(n) = \frac{1}{2}\hat{\mu}_n^\top\left(\sum_{m \in S(n)} G_{ii}^{(m)}\right)\hat{\mu}_n. \quad \text{Eqn. 59}$$

Thus, the likelihood gained by splitting node n into $n_+^q$ and $n_-^q$ is given by:

$$\Delta \mathcal{L}(n;q) = \mathcal{L}(n_+^q) + \mathcal{L}(n_-^q) - \mathcal{L}(n) \quad \text{Eqn. 60.}$$

And the decision tree generating algorithm splits the node according to the split which maximizes this function.

Thus, using the above, it is possible to construct a decision tree for each cluster where the tree is arranged so that the optimal question is asked first in the tree and the decisions are arranged in hierarchical order according to the likelihood of splitting. A weighting is then applied to each cluster.

Decision trees might be also constructed for variance using similar principles.

Constained maximum likelihood linear regression (CMLLR) is another technique for training models with for multiple speakers. The model is trained for different speakers by using a technique of linear regression to relate the observation vector for each speaker to that of a canonical model.

Training of the model comprises first training the canonical model using data from all of the training data. In an embodiment, this is performed using a standard expectationmaximization algorithm. CMLLR transform parameters are then trained for each individual speaker.

The CMLLR transform parameters comprise a set of speaker-dependent linear transforms $W^{(s)}=[b^{(s)T}A^{(s)T}]^T$ which transform the mean $\mu_m$ and covariance $\Sigma_m$ of the canonical model, where A and b are the transform matrix and bias vector respectively.

Using these transforms, the probability of the observation vector can be expressed as $$p(o_t|W^{(s)},\mu_m,\Sigma_m)=N(A^{(s)}o_t+b^{(s)};\mu_m,\Sigma_m) \quad \text{Eqn. 61}$$

To estimate the CMLLR transform parameters W using a maximum likelihood criterion, the auxiliary function $Q(W^{(s)},\hat{W}^{(s)})$ is used. The parameter estimation of CMLLR is performed in a row-by-row fashion. For a particular row $\hat{w}_i$, the auxiliary function can be written as:

$$Q(W^{(s)},\hat{W}^{(s)})=\beta^{(s)}\log(c_i^{(s)}\hat{w}_i^{(s)})-\tfrac{1}{2}\hat{w}_i^{(s)}G^{(s)(i)}\hat{w}_i^{(s)T}+\hat{w}_i^{(s)}k^{(i)T}+X_i \quad \text{Eqn. 62}$$

where $c_i^{(s)}$ is the extended cofactor row vector of the $i^{th}$ row vector of $\hat{W}^T$ and $X_i$ is a term independent of the target CMLLR transforms. In the case of a diagonal covariance matrix, the statistics $\beta^{(s)}$, $G^{(s)(i)}$ and $k^{(s)(i)}$ are defined as follows:

$$\beta^{(s)}=\sum_m\sum_t\gamma_m^{(s)}(t), \quad \text{Eqn. 63}$$

$$G^{(s)(i)}=\sum_m\frac{1}{\sigma_i^{(m)2}}\sum_t\gamma_m^{(s)}(t)\zeta(t)\zeta(t)^T, \quad \text{Eqn. 64}$$

$$k^{(s)(i)}=\sum_m\frac{1}{\sigma_i^{(m)2}}\mu_i^{(m)}\sum_t\gamma_m^{(s)}(t)\zeta(t)^T, \quad \text{Eqn. 65}$$

where $\zeta(t)$ is the extended observation vector, $[1\ o(t)^T]^T$.

Differentiating with respect to $w_i^{(s)}$ yields:

$$\frac{dQ(W^{(s)},\hat{W}^{(s)})}{dw_i^{(s)}}=\beta^{(s)}\frac{c_i^{(s)}}{c_i^{(s)}\hat{w}_i^{(s)}}-\hat{w}_i^{(s)}G^{(s)(i)}+k^{(s)(i)}. \quad \text{Eqn. 66}$$

Setting the right side of Eqn 66 to 0, the $\hat{w}_i^{(s)}$ can be calculated as:

$$\hat{w}_i^{(s)}=(\alpha c_i^{(s)}+k^{(s)(i)})G^{(s)(i)-1} \quad \text{Eqn. 67}$$

Where $\alpha$ is the root of the quadratic equation:

$$\alpha^2 c_i^{(s)}G^{(s)(i)-1}c_i^{(s)T}+\alpha c_i^{(s)}G^{(s)(i)-1}k^{(s)(i)T}-\beta^{(s)}=0 \quad \text{Eqn. 68}$$

There are two roots for the quadratic equation. The final solution is the one which maximizes the auxiliary function $Q(W^{(s)},\hat{W}^{(s)})$.

For some tasks, it is necessary to model more than one factor simultaneously. For example, the synthesis of a voice for reading an ebook, may require the synthesis of several voices with expressive speech. However, directly building a model for each combination of speaker and expression or expression is often impractical since expressive training data may not be available for every speaker.

A solution to this problem is provided by using factorization techniques which model the speaker and expression independently when using training data with multiple attributes and speakers. Factorization techniques can be based on CAT, CMLLR, the combination of CAT and CMLLR or other maximum likelihood techniques.

Speaker and expression factorization (SEF) based on the CAT training method involves using CAT weight vectors to represent both speaker and expression information, i.e. some dimensions of the CAT weight vector are used to model the speaker while the others are used to model the expressions. Parameters corresponding to neutral speakers and parameters corresponding to expressions are arranged into separate clusters. Eqn. 43 can then be rewritten as:

$$p(o_t|\lambda_{s,e},M_{s,e}^{(m)},\Sigma^{(m)})=N(o_t;\mu^{(m,l)}+M_s^{(m)}\lambda_s+M_E^{(m)}\lambda_E,\Sigma^{(m)}) \quad \text{Eqn. 69,}$$

where $\lambda_s$ and $\lambda_e$ are the CAT weight vectors to model the speaker and expression respectively; $M_s^{(m)}$ and $M_e^{(m)}$ are the cluster mean matrices for component m which are associated to the expression CAT weight vector and speaker CAT weight vector respectively; and $\mu^{(m,l)}$ is the mean vector for component m in the bias cluster.

SEF can also be achieved within the CMLLR training framework discussed above. The approach involves the cascade of two linear transforms, one to model the speaker and the other to model the expression, i.e. the observation vector undergoes the following transform:

$$\hat{o}_t=A_{s,e}\cdot o_t+b_{s,e}=A_s\cdot(A_e\cdot o_t+b_e)+b_s \quad \text{Eqn. 70,}$$

such that Eqn. 43 becomes:

$$p(o_t|W_s,W_e,\mu^{(m)},\Sigma^{(m)})=N(A_s\cdot(A\Delta_e\cdot o_t+b_e)+b_s;\mu^{(m)},\Sigma^{(m)}) \quad \text{Eqn. 70a}$$

SEF can also be applied by combining CAT and CMLLR. In this case, the speaker information can be modelled by CMLLR transforms while the expression information can be modelled by the CAT weight vector. The probability function for the observation vector therefore becomes:

$$p(o_t|W_s,\lambda_e,M_e^{(m)},\Sigma^{(m)})=N(A_s o_t+b_s)+b_s;\mu^{(m,l)}+M_e^{(m)},\Sigma^{(m)}) \quad \text{Eqn. 71.}$$

Alternatively, the CMLLR can be used to model the expression and the CAT weight vector to model the speaker. In that case the probability function for the observation vector becomes:

$$p(o_t|\lambda_s,M_s^{(m)},W_e,\Sigma^{(m)})=N(A_e o_t+b_e;\mu^{(m,l)}+M_s^{(m)}\lambda_s,\Sigma^{(m)}) \quad \text{Eqn. 72.}$$

The invention claimed is:

1. A text-to-speech method configured to output speech having a target value of a speech factor,
said method comprising:
inputting audio data with said target value of a speech factor;
adapting an acoustic model to said target value of a speech factor;
inputting text;
dividing said inputted text into a sequence of acoustic units;
converting said sequence of acoustic units into a sequence of speech vectors using said acoustic model; and
outputting said sequence of speech vectors as audio with said target value of a speech factor,
wherein said acoustic model comprises a set of speech factor parameters that enable the acoustic model to accommodate speech for the different values of a speech factor,
and wherein said set of speech factor parameters are unlabeled, such that for a given one or more parameters, the value of said speech factor to which they relate is unknown,
and wherein adapting the acoustic model comprises adjusting the speech factor parameters to substantially match the target value of a speech factor, wherein said text to speech method includes training said acoustic model using a method comprising:

receiving speech data, said speech data comprising data corresponding to different values of the speech factor, and wherein said speech data is unlabeled, such that for a given item of speech data, the value of said speech factor is unknown;

clustering said speech data according to the value of said speech factor into a first set of clusters; and estimating a first set of parameters to enable the acoustic model to accommodate speech for the different values of the speech factor, wherein said clustering and said first parameter estimation are jointly performed according to a common maximum likelihood criterion.

2. The text to speech method of claim 1, wherein said speech factor is expression and the acoustic model further comprises a set of expression parameters relating to speaker and a set of clusters relating to speaker;

and wherein said set of expression parameters and said set of speaker parameters and said set of expression clusters and said set of speaker clusters do not overlap, and wherein the method is configured to transplant an expression from a first speaker to a second speaker, by employing expression parameters obtained from the speech of a first speaker with that of a second speaker.

3. A text to speech method, the method comprising:

receiving input text;

dividing said inputted text into a sequence of acoustic units;

converting said sequence of acoustic units to a sequence of speech vectors using an acoustic model, wherein said acoustic model comprises a set of speaker parameters and a set of speaker clusters relating to speaker voice and a set of expression parameters and a set of expression clusters relating to expression, and wherein the sets of speaker and expression parameters and the sets of speaker and expression clusters do not overlap; and outputting said sequence of speech vectors as audio, the method further comprising determining at least some of said parameters relating to expression by:

extracting expressive features from said input text to form an expressive linguistic feature vector constructed in a first space; and mapping said expressive linguistic feature vector to an expressive synthesis feature vector which is constructed in a second space, wherein said text to speech method includes training said acoustic model using a method comprising:

receiving speech data, said speech data further comprising speech data from one or more speakers speaking with neutral speech, said speech data comprising data corresponding to different values of a first speech factor, wherein the first speech factor is speaker and speech data corresponding to different values of a second speech factor, wherein the second speech factor is expression, and wherein said speech data is unlabeled, such that for a given item of speech data, the value of said first speech factor is unknown;

clustering said speech data according to the value of said first speech factor into a first set of clusters and clustering said speech data according to the value of said second speech factor into a second set of clusters; and estimating a first set and a second set of parameters to enable the acoustic model to accommodate speech for the different values of the first speech factor and the second speech factor respectively, wherein said clustering and the parameter estimation are jointly performed according to a common maximum likelihood criterion which is common to both parameter estimation and said clustering.

4. The method of claim 3 wherein said second space is the acoustic space of a first speaker and the method is configured to transplant the expressive synthesis feature vector to the acoustic space of a second speaker.

5. A text to speech method, the method comprising:

receiving input text;

dividing said inputted text into a sequence of acoustic units;

converting said sequence of acoustic units to a sequence of speech vectors using an acoustic model; and outputting said sequence of speech vectors as audio, the method further comprising determining at least some of said second set of parameters by:

extracting expressive features from said input text to form an expressive linguistic feature vector constructed in a first space; and mapping said expressive linguistic feature vector to an expressive synthesis feature vector which is constructed in a second space, wherein said text to speech method includes training said acoustic model using a method comprising:

receiving speech data, said speech data further comprising speech data from one or more speakers speaking with neutral speech, said speech data comprising data corresponding to different values of a first speech factor, wherein the first speech factor is speaker and speech data corresponding to different values of a second speech factor, wherein the second speech factor is expression, and wherein said speech data is unlabeled, such that for a given item of speech data, the value of said first speech factor is unknown;

clustering said speech data according to the value of said first speech factor into a first set of clusters and clustering said speech data according to the value of said second speech factor into a second set of clusters; and estimating a first set and a second set of parameters to enable the acoustic model to accommodate speech for the different values of the first speech factor and the second speech factor respectively, wherein said clustering and the parameter estimation are jointly performed according to a common maximum likelihood criterion which is common to both parameter estimation and said clustering, and wherein said first and second set of parameters and said first and second set of clusters do not overlap.

6. A system configured to output speech having a target value of a speech factor, said system comprising:

an audio input for receiving audio data with said target value of a speech factor;

a text input for receiving text; and a processor configured to adapt an acoustic model to said target value of a speech factor;

divide said inputted text into a sequence of acoustic units;

convert said sequence of acoustic units into a sequence of speech vectors using said acoustic model; and output said sequence of speech vectors as audio with said target value of a speech factor, wherein said acoustic model comprises a first set of parameters that enable to acoustic model to accommodate speech for the different values of the speech factor;

and wherein said first set of parameters are unlabeled, such that for a given one or more parameters, the value of said first speech factor is unknown, and wherein adapting the acoustic model comprises adjusting the speech factor parameters to substantially match the target value of a speech factor, wherein said text to speech method includes training said acoustic model using a method comprising:

receiving speech data, said speech data comprising data corresponding to different values of the speech factor, and wherein said speech data is unlabeled, such that for a given item of speech data, the value of said speech factor is unknown;

clustering said speech data according to the value of said speech factor into a first set of clusters; and estimating a first set of parameters to enable the acoustic model to accommodate speech for the different values of the speech factor, wherein said clustering and said first parameter estimation are jointly performed according to a common maximum likelihood criterion.

7. A text to speech system, the system comprising:
an input for receiving input text; and
a processor configured to
divide said inputted text into a sequence of acoustic units;
convert said sequence of acoustic units to a sequence of speech vectors using an acoustic model, wherein said acoustic model comprises a first set of parameters and a first set of clusters relating to speaker voice and a second set of parameters and a second set of clusters relating to expression, and wherein the first and second set of parameters and the first and second set of clusters do not overlap; and
output said sequence of speech vectors as audio, determine at least some of said parameters relating to expression by:

extracting expressive features from said input text to form an expressive linguistic feature vector constructed in a first space; and mapping said expressive linguistic feature vector to an expressive synthesis feature vector which is constructed in a second space, wherein said text to speech method includes training said acoustic model using a method comprising:

receiving speech data, said speech data further comprising speech data from one or more speakers speaking with neutral speech, said speech data comprising data corresponding to different values of a first speech factor, wherein the first speech factor is speaker and speech data corresponding to different values of a second speech factor, wherein the second speech factor is expression, and wherein said speech data is unlabeled, such that for a given item of speech data, the value of said first speech factor is unknown;

clustering said speech data according to the value of said first speech factor into a first set of clusters and clustering said speech data according to the value of said second speech factor into a second set of clusters; and estimating a first set and a second set of parameters to enable the acoustic model to accommodate speech for the different values of the first speech factor and the second speech factor respectively, wherein said clustering and the parameter estimation are jointly performed according to a common maximum likelihood criterion which is common to both parameter estimation and said clustering.

8. A non-transitory carrier medium comprising computer readable code configured to cause a computer to perform the method of claim 1.

9. A non-transitory carrier medium comprising computer readable code configured to cause a computer to perform the method of claim 3.

* * * * *